(12) United States Patent
Morita et al.

(10) Patent No.: US 10,472,441 B2
(45) Date of Patent: Nov. 12, 2019

(54) BINDER FOR POWER STORAGE DEVICE ELECTRODE

(71) Applicant: SEKISUI CHEMICAL CO., LTD., Osaka (JP)

(72) Inventors: Hiroyuki Morita, Osaka (JP); Yasuharu Nagai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/746,535

(22) PCT Filed: Sep. 14, 2016

(86) PCT No.: PCT/JP2016/077166
§ 371 (c)(1),
(2) Date: Jan. 22, 2018

(87) PCT Pub. No.: WO2017/047662
PCT Pub. Date: Mar. 23, 2017

(65) Prior Publication Data
US 2018/0201709 A1 Jul. 19, 2018

(30) Foreign Application Priority Data

Sep. 17, 2015 (JP) ................................. 2015-184206
Sep. 17, 2015 (JP) ................................. 2015-184207

(51) Int. Cl.
| | |
|---|---|
| C08F 216/38 | (2006.01) |
| C08L 29/14 | (2006.01) |
| H01M 4/13 | (2010.01) |
| H01M 4/62 | (2006.01) |
| C08F 8/28 | (2006.01) |

(52) U.S. Cl.
CPC ............ *C08F 216/38* (2013.01); *C08F 8/28* (2013.01); *C08L 29/14* (2013.01); *H01M 4/13* (2013.01); *H01M 4/62* (2013.01); *H01M 4/622* (2013.01)

(58) Field of Classification Search
CPC ....................................................... C08F 8/28
See application file for complete search history.

(56) References Cited

U.S. PATENT DOCUMENTS

| | | | | |
|---|---|---|---|---|
| 2006/0014049 A1* | 1/2006 | Ichinose | ................. | B32B 18/00 428/701 |
| 2012/0189770 A1* | 7/2012 | Nakash | ................. | B41C 1/1033 427/144 |
| 2013/0197154 A1* | 8/2013 | Yamaguchi | ....... | C04B 35/63416 524/543 |
| 2015/0240018 A1* | 8/2015 | Nagai | .................... | C08K 5/103 524/557 |
| 2015/0333333 A1* | 11/2015 | Mesuda | ................ | H01M 4/623 252/182.1 |

FOREIGN PATENT DOCUMENTS

| | | | |
|---|---|---|---|
| EP | 0319613 | * | 6/1989 |
| EP | 3 125 340 | | 2/2017 |
| JP | 09-249845 | | 9/1997 |
| JP | 2002-283699 | | 10/2002 |
| JP | 2009-158099 | | 7/2009 |
| JP | 2013-121906 | | 6/2013 |
| JP | 2013-155366 | | 8/2013 |
| JP | 2014-189681 | | 10/2014 |
| JP | 2015-088487 | | 5/2015 |
| JP | 2015-196753 | | 11/2015 |
| WO | WO 2014/050795 | * | 3/2014 |

OTHER PUBLICATIONS

Extended European Search Report dated Jan. 22, 2019 in corresponding European Patent Application No. 16846533.4.
International Search Report dated Dec. 6, 2016 in International (PCT) Application No. PCT/JP2016/077166.

* cited by examiner

*Primary Examiner* — Jeffrey C Mullis
(74) *Attorney, Agent, or Firm* — Wenderoth, Lind & Ponack, L.L.P.

(57) ABSTRACT

The present invention aims to provide a binder for a power storage device electrode which favorably maintains adhesiveness between active materials in a long-term cycle, and which enables production of a high-capacity storage battery with a small irreversible capacity and low resistance to have excellent output characteristics. The present invention further aims to provide a composition for a power storage device electrode, a power storage device electrode, and a power storage device each prepared using the binder for a power storage device electrode. The present invention relates to a binder for a power storage device electrode used for an electrode of a power storage device, the binder containing a polyvinyl acetal resin, the polyvinyl acetal resin having a hydroxy group-containing structural unit of the formula (1) comprising a hydroxy group-containing structural unit with a sequence length of 1, the hydroxy group-containing structural unit with a sequence length of 1 constituting 25% by weight or less of the whole hydroxy group-containing structural unit in the polyvinyl acetal resin, the polyvinyl acetal resin having a hydroxy group content of 30 to 60 mol %:

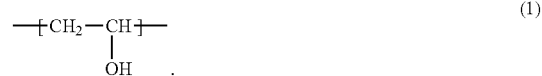

(1)

18 Claims, No Drawings

BINDER FOR POWER STORAGE DEVICE ELECTRODE

TECHNICAL FIELD

The present invention relates to a binder for a power storage device electrode which is excellent in adhesiveness and capable of improving the flexibility of an electrode to be obtained when used as a binder for a power storage device electrode, and which has high resistance against electrolytes. The present invention also relates to a binder for a power storage device electrode which favorably maintains adhesiveness between active materials in a long-term cycle, and which enables production of a high-capacity storage battery with a small irreversible capacity and low resistance to have excellent output characteristics. The present invention further relates to a composition for a power storage device electrode, a power storage device electrode, and a power storage device each prepared using the binder for a power storage device electrode.

BACKGROUND ART

Along with the recent spread of portable electronic devices such as portable video cameras or portable PCs, a demand for secondary batteries as movable power sources has rapidly increased. Moreover, such secondary batteries are severely demanded to be smaller and lighter, and have a higher energy density.

Typically, mainstream secondary batteries that can repeat charge and discharge are lead batteries, nickel-cadmium batteries, and the like. These batteries are excellent in charge/discharge characteristics but not enough as movable power sources for portable electronic devices in terms of the battery weight or energy density.

To overcome the situation, research and development are actively made on lithium secondary batteries, as secondary batteries, in which lithium or a lithium alloy is used for a negative electrode. Lithium secondary batteries have excellent characteristics including high energy density, low self-discharge, and light weight.

An electrode of a lithium secondary battery is commonly formed by kneading an active material and a binder together with a solvent for dispersion of the active material to prepare a slurry, applying the slurry to a current collector by, for example, a doctor blade method, and drying the applied slurry to form a thin film.

At the present, fluororesins typified by polyvinylidene fluoride (PVDF) are most widely used as binders for electrodes (negative electrodes) of lithium secondary batteries.

Fluororesins however swell with electrolytes when used as binders to cause peeling at an electrode interface in a long-term cycle, lowering the battery characteristics.

As an aqueous binder, carboxymethyl cellulose or the like is used. In a case where carboxymethyl cellulose is used, the flexibility of the resin is insufficient. In such a case, the effect of binding the active material may be insufficient or the adhesion force to the current collector may be markedly lowered.

Patent Literature 1 teaches that the use of a low-crystalline carbon having a graphite interlayer distance (d002) of 0.345 to 0.370 nm as a negative-electrode active material, a styrene-butadiene copolymer (SBR) as a binder, and carboxymethyl cellulose as a thickener can provide a favorable negative electrode, leading to production of a battery excellent in output characteristics.

However, also in the case where SBR is used as a binder, the binder swells with an electrolyte to cause peeling at an electrode interface, lowering the battery characteristics.

CITATION LIST

Patent Literature

Patent Literature 1: JP 2009-158099 A

SUMMARY OF INVENTION

Technical Problem

The present invention aims to provide a binder for a power storage device electrode which is excellent in adhesiveness and capable of improving the flexibility of an electrode to be obtained when used as a binder for a power storage device electrode, and which has high resistance against electrolytes. The present invention also aims to provide a binder for a power storage device electrode which favorably maintains adhesiveness between active materials in a long-term cycle, and which enables production of a high-capacity storage battery with a small irreversible capacity and low resistance to have excellent output characteristics. The present invention further aims to provide a composition for a power storage device electrode, a power storage device electrode, and a power storage device each prepared using the binder for a power storage device electrode.

Solution to Problem

The present invention relates to a binder for a power storage device electrode used for an electrode of a power storage device, the binder containing a polyvinyl acetal resin, the polyvinyl acetal resin having a hydroxy group-containing structural unit of the formula (1) comprising a hydroxy group-containing structural unit with a sequence length of 1, the hydroxy group-containing structural unit with a sequence length of 1 constituting 25% by weight or less of the whole hydroxy group-containing structural unit in the polyvinyl acetal resin, the polyvinyl acetal resin having a hydroxy group content of 30 to 60 mol %:

The present invention is specifically described in the following.

The present inventors made intensive studies to find out that the use of a polyvinyl acetal resin having a hydroxy group-containing structural unit of the formula (1) and having a proportion of the hydroxy group-containing structural unit with a sequence length of 1 and a hydroxy group content each within a specific range, in a binder for a power storage device electrode, allows the binder to be less likely to swell with an electrolyte, to favorably maintain adhesiveness between active materials in a long-term cycle, and to enable production of a high-capacity storage battery with a small irreversible capacity and low resistance to have excellent output characteristics. The present invention was thus completed.

The binder for a power storage device electrode of the present invention contains a polyvinyl acetal resin.

According to the present invention, the use of a polyvinyl acetal resin as a resin component of the binder causes an attractive interaction between the polyvinyl acetal resin and an active material, enabling immobilization of the active material with a small amount of the binder.

The polyvinyl acetal resin also has an attractive interaction with a conductive aid to maintain the distance between the active material and the conductive aid within a specific range. Such maintenance of a reasonable distance between the active material and the conductive aid greatly improves the dispersibility of the active material.

In addition, in comparison with the case where a resin such as PVDF is used, the adhesiveness to the current collector is significantly improved. Moreover, in comparison with the case where carboxymethyl cellulose is used, the dispersibility of the active material and adhesiveness is excellent to exhibit a sufficient effect even when the amount of the added binder is small.

Moreover, according to the present invention, the use of a polyvinyl acetal resin as a resin component of a binder resin provides an electrode with sufficient flexibility and less likely to swell with an electrolyte.

The binder for a power storage device electrode of the present invention may consist of a resin component or additionally contain a dispersing medium.

The lower limit of the hydroxy group content of the polyvinyl acetal resin is 30 mol %, and the upper limit thereof is 60 mol %. When the hydroxy group content is 30 mol % or more, the resistance against electrolytes may be sufficient to suppress dissolution of a resin component into an electrolyte upon immersion of the electrode in the electrolyte. When the hydroxy group content is 60 mol % or less, the productivity is improved. In addition, slurry prepared by dissolving the polyvinyl acetal resin has not too high a solution viscosity to allow sufficient dispersion of the active material. Further, slurry prepared by dispersing the polyvinyl acetal resin in the form of fine particles has improved stability to suppress fusion of particles, leading to sufficient dispersion of the active material.

The lower limit of the hydroxy group content is preferably 35 mol %, and the upper limit thereof is preferably 55 mol %.

The hydroxy group containing a structural unit with a sequence of 1 constitutes 25% by weight or less of the whole hydroxy group containing structural unit in the polyvinyl acetal resin. With the proportion of the hydroxy group-containing structural unit with a sequence length of 1 of 25% by weight or less, the resistance against electrolytes can be sufficiently improved to avoid swelling of the resin component with electrolytes, improving the battery characteristics.

The upper limit of the proportion of the hydroxy group-containing structural unit with a sequence length of 1 is preferably 23% by weight, more preferably 18% by weight.

The lower limit of the proportion of the hydroxy group-containing structural unit with a sequence length of 1 is not particularly limited, and is preferably 5% by weight.

The "sequence length" of the hydroxy group-containing structural unit means the number of continuous hydroxy group-containing structural units. The "sequence length of 1" means that the hydroxy group-containing structural units are not continuous, and the "hydroxy group-containing structural unit with a sequence length of 1" refers to a hydroxy group-containing structural unit that is not adjacent to another hydroxy group-containing structural unit.

The proportion of the hydroxy group-containing structural unit can be calculated by, for example, dissolving the polyvinyl acetal resin in deuterated dimethyl sulfoxide to a concentration of 1% by weight, followed by proton NMR or carbon NMR.

To set the proportion of the hydroxy group-containing structural unit with a sequence length of 1 in the polyvinyl acetal resin within the above range, the degree of acetalization needs to be appropriately adjusted. The degree of acetalization is preferably not too low and not too high. Similarly, the hydroxy group content is preferably not too low and not too high. To achieve the proportion of the hydroxy group-containing structural unit with a sequence length of 1 within an appropriate range, the degree of acetalization is preferably 40 to 70 mol % and the hydroxy group content is preferably 30 to 60 mol %. To adjust the proportion of the hydroxy group-containing structural unit with a sequence length of 1, an effective method includes dissolving and heating the polyvinyl acetal resin in an alcohol under acidic conditions to perform desorption and recombination of the acetal ring, thereby adjusting the proportion of the hydroxy group-containing structural unit with a sequence length of 1. Specifically, the polyvinyl acetal resin is dissolved in isopropyl alcohol adjusted to be acidic, and then reacted under a high-temperature condition of about 70° C. to 80° C. For adjusting the proportion of the hydroxy group-containing structural unit with a sequence length of 1 in the polyvinyl acetal resin within the appropriate range, the reaction time and the acid concentration are preferably adjusted. For a lower proportion of the hydroxy group-containing structural unit with a sequence length of 1 in the polyvinyl acetal resin, preferably, the reaction time is set longer or the acid concentration is set higher. For a higher proportion of the hydroxy group-containing structural unit with a sequence length of 1 in the polyvinyl acetal resin, preferably, the reaction time is set shorter or the acid concentration is set lower. The reaction time is preferably 0.1 to 10 hours and the acid concentration is preferably 0.5 mM to 0.3 M.

The polyvinyl acetal resin preferably has a degree of acetalization, determined as a total degree of acetalization, of 40 to 70 mol % in either case of using a pure aldehyde or a mixed aldehyde. When the total degree of acetalization is 40 mol % or higher, the resin has better flexibility to sufficiently exhibit an adhesion force to the current collector. When the degree of acetalization is 70 mol % or lower, the resistance against electrolytes is improved to suppress dissolution of a resin component into an electrolyte upon immersion of the electrode in the electrolyte. The degree of acetalization is more preferably 45 to 65 mol %.

The polyvinyl acetal resin preferably has a structural unit of the formula (2). In the formula (2), $R^1$ represents a hydrogen atom or a C1-C20 alkyl group.

Having a structural unit of the formula (2), the polyvinyl acetal resin has favorable resistance against electrolytes, thereby suppressing swelling of the resin component with an electrolyte or dissolution of the resin component into the electrolyte.

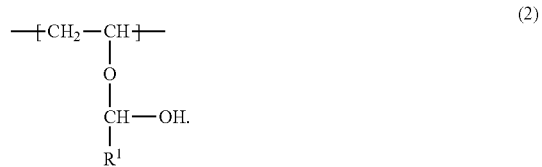

For $R^1$, the C1-C20 alkyl group is not limited, and examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

$R^1$ is preferably a propyl group from the standpoint of further improving the binding properties between the active materials or between the active material and the current collector and also further improving the swelling resistance against electrolytes.

The lower limit of the amount of the structural unit of the formula (2) in the polyvinyl acetal resin is preferably 0.3 mol %. When the amount of the structural unit of the formula (2) is 0.3 mol % or more, the effect of improving the resistance against electrolytes can be sufficiently exerted. Moreover, the resin has favorable flexibility, thereby suppressing generation of cracks or fractures.

The lower limit of the amount of the structural unit of the formula (2) is more preferably 0.4 mol %, still more preferably 0.5 mol %. The upper limit thereof is preferably 5 mol %, more preferably 3 mol %, still more preferably 2 mol %.

The amount of the structural unit of the formula (2) can be calculated by the following method.

Specifically, the polyvinyl acetal resin is dissolved in deuterated dimethyl sulfoxide to a concentration of 1% by weight, and proton NMR was performed at a measurement temperature of 150° C. Using the integrated values of a peak (A) appearing around 4.8 ppm, a peak (B) appearing around 4.2 ppm, a peak (C) appearing around 1.0 to 1.8 ppm, and a peak (D) appearing around 0.9 ppm, the amount of the structural unit of the formula (2) is calculated based on the following equation:

Amount of the structural unit of the formula (2) (mol %)={(A−B/2)/[(C−4D/3)/2]}×100.

The amount of the structural unit of the formula (2) in the polyvinyl acetal resin is preferably set high when the hydroxy group content of the polyvinyl acetal resin is high. When the polyvinyl acetal resin has a high hydroxy group content, the binder resin tends to be hard due to intermolecular hydrogen bonding, leading to easy occurrence of cracks or fractures. An increase in the amount of the structural unit of the formula (2) improves the flexibility of the resin to suppress occurrence of cracks or fractures.

When the polyvinyl acetal resin has a low hydroxy group content, the amount of the structural unit of the formula (2) in the polyvinyl acetal resin is preferably set low.

When the polyvinyl acetal resin has a low hydroxy group content, the flexibility of the resin is sufficiently exhibited even in a range where the amount of the structural unit of the formula (2) is low, thereby suppressing occurrence of cracks or fractures. In addition, the resistance against electrolytes becomes high.

Examples of the methods for producing the polyvinyl acetal resin having a structural unit of the formula (2) include: a method in which a modified polyvinyl alcohol raw material having a structural unit of the formula (2) is reacted with an aldehyde to be acetalized; a method in which a polyvinyl acetal resin is produced under an action of a compound reactive with the functional group of the polyvinyl alcohol raw material so as to have a structural unit of the formula (2) in the molecule; and a method in which, after preparation of a polyvinyl acetal resin, the polyvinyl acetal resin is reacted with a compound reactive with a functional group of the polyvinyl acetal resin so as to have a structural unit of the formula (2) in the molecule. In particular, from the standpoint of the productivity and easy adjustment of the amount of the structural unit of the formula (2), preferred is a method in which, after preparation of a polyvinyl acetal resin, the polyvinyl acetal resin is reacted with a compound reactive with a functional group of the polyvinyl acetal resin so as to have a structural unit of the formula (2) in the molecule.

Examples of the method of reacting a compound reactive with a functional group of the polyvinyl acetal resin include: a method of performing dehydration condensation of a geminal diol compound having two hydroxy groups for one carbon atom, with one hydroxy group of the polyvinyl acetal resin; and a method of adding an aldehyde compound to one hydroxy group of the polyvinyl acetal resin. In particular, from the standpoint of the productivity and easy adjustment of the amount of the structural unit of the formula (2), preferred is a method of adding an aldehyde compound to one hydroxy group of the polyvinyl acetal resin.

Examples of the method of adding an aldehyde compound to one hydroxy group of the polyvinyl acetal resin include a method of dissolving the polyvinyl acetal resin in isopropyl alcohol adjusted to be acidic and then reacting an aldehyde under a high-temperature condition of about 70° C. to 80° C. To set the amount of the structural unit of the formula (2) in the polyvinyl acetal resin within the above appropriate range, the reaction time or the acid concentration is preferably adjusted. For a smaller amount of the structural unit of the formula (2) in the polyvinyl acetal resin, preferably, the reaction time is set longer or the acid concentration is set higher. For a larger amount of the structural unit of the formula (2) in the polyvinyl acetal resin, preferably, the reaction time is set shorter or the acid concentration is set lower. The reaction time is preferably 0.1 to 10 hours and the acid concentration is preferably 0.5 mM to 0.3 M.

The lower limit of the acetyl group content of the polyvinyl acetal resin is preferably 0.2 mol %, and the upper limit thereof is preferably 20 mol %. When the polyvinyl acetal resin has an acetyl group content of 0.2 mol % or more, the flexibility can be improved, sufficiently improving the adhesiveness to aluminum foil. When the polyvinyl acetal resin has an acetyl group content of 20 mol % or less, the resistance against electrolytes is sufficient to suppress dissolution of a resin component in an electrolyte upon immersion of the electrode in the electrolyte. The lower limit of the acetyl group content is more preferably 1 mol %.

In particular, the lower limit of the degree of polymerization of the polyvinyl acetal resin is preferably 250, and the upper limit thereof is preferably 4,000. When the degree of polymerization is 250 or more, the resistance against electrolytes is sufficient to prevent dissolution of an electrode into an electrolyte, thereby suppressing occurrence of a short circuit. When the degree of polymerization is 4,000 or less, the adhesiveness to an active material can be improved, thereby improving the discharge capacity of the lithium secondary battery. The lower limit of the degree of polymerization is more preferably 280, and the upper limit thereof is more preferably 3,500.

The acetalization method is not particularly limited, and a conventionally known method may be employed. Examples of the method include a method of adding any aldehyde to an aqueous solution of polyvinyl alcohol in the presence of an acid catalyst such as hydrochloric acid.

The aldehyde used for the acetalization is not particularly limited, and examples thereof include formaldehyde (including paraformaldehyde), acetaldehyde (including paraacetaldehyde), propionaldehyde, butyraldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. In particular, preferred is acetaldehyde or butyraldehyde in terms of the productivity and property balance. These aldehydes may be used alone, or two or more thereof may be used in combination.

The polyvinyl alcohol may be one prepared by saponifying a copolymer of a vinyl ester and an α-olefin. Further, an ethylenically unsaturated monomer may be further copolymerized to make the polyvinyl alcohol contain a component derived from the ethylenically unsaturated monomer. Terminal polyvinyl alcohol obtainable by copolymerizing a vinyl ester monomer such as vinyl acetate and α-olefin in the presence of a thiol compound such as thiol acetate and mercapto propionate and saponifying the resulting copolymer may also be used. The α-olefin is not particularly limited, and examples thereof include methylene, ethylene, propylene, isopropylene, butylene, isobutylene, pentylene, hexylene, cyclohexylene, cyclohexylethylene, and cyclohexylpropylene.

The polyvinyl acetal resin preferably has an ionic functional group. The ionic functional group is preferably at least one functional group selected from the group consisting of a carboxy group, a sulfonic acid group, a sulfinic acid group, a sulfenic acid group, a phosphoric acid group, a phosphonic acid group, an amino group, and salts of these. Among these, more preferred are a carboxy group, a sulfonic acid group, and salts of these, and particularly preferred are a sulfonic acid group and salts thereof. Having an ionic functional group, the polyvinyl acetal resin has better dispersibility in the composition for a lithium secondary battery electrode. In addition, the dispersibility of the active material and the conductive aid is in particular excellent.

Examples of the salts include sodium salt and potassium salt.

The ionic functional group content of the polyvinyl acetal resin is preferably 0.01 to 1 mmol/g. The ionic functional group content of 0.01 mmol/g or more can improve the dispersibility of the polyvinyl acetal resin in the form of fine particles in the composition for a lithium secondary battery electrode and the dispersibility of the active material and the conductive aid when the composition is formed into an electrode. The ionic functional group content of 1 mmol/g or less can improve the durability of the binder after preparation of a battery, improving the discharge capacity of the lithium secondary battery. The ionic functional group content of the polyvinyl acetal resin is more preferably 0.02 to 0.5 mmol/g. The ionic functional group content can be measured by NMR.

The ionic functional group may be present directly in the polyvinyl acetal resin structure or in a graft chain of a polyvinyl acetal resin containing the graft chain (hereafter, also simply referred to as a graft copolymer). In particular, the ionic functional group is preferably present directly in the polyvinyl acetal resin structure because the resistance against electrolytes and the dispersibility of the active material and the conductive aid when the composition is formed into an electrode are excellent.

In a case where the ionic functional group is present directly in the polyvinyl acetal resin structure, the molecular structure is preferably a chain molecular structure in which the ionic functional group is bonded to carbon included in the main chain of the polyvinyl acetal resin or a molecular structure in which the ionic functional group is bonded via an acetal bond. In particular, the molecular structure in which the ionic functional group is bonded via an acetal bond is preferred.

The presence of the ionic functional group in the above structure can improve the dispersibility of the polyvinyl acetal resin in the composition for a lithium secondary battery electrode so that the dispersibility of the active material and the conductive aid when the composition is formed into an electrode becomes particularly excellent. In addition, deterioration of the binder after preparation of a battery is suppressed, thereby suppressing reduction in the discharge capacity of the lithium secondary battery.

A polyvinyl acetal resin having the ionic functional group directly in the polyvinyl acetal resin structure may be prepared by any method. Examples thereof include a method of reacting a modified polyvinyl alcohol raw material having the ionic functional group with an aldehyde to be acetalized and a method of, after preparation of a polyvinyl acetal resin, reacting the polyvinyl acetal resin with a compound having the ionic functional group and a different functional group reactive with the functional group of the polyvinyl acetal resin.

In a case where the polyvinyl acetal resin has an ionic functional group via an acetal bond, the acetal bond and the ionic functional group are preferably connected by a chain or cyclic alkyl group or an aromatic ring. In particular, the acetal bond and the ionic functional group are preferably connected by an alkylene group having 1 or more carbon atoms, a cyclic alkylene group having 5 or more carbon atoms, an aryl group having 6 or more carbon atoms, or the like. Especially, the acetal bond and the ionic functional group are preferably connected by an alkylene group having 1 or more carbon groups or an aromatic ring.

With this structure, the resistance against electrolytes and the dispersibility of the active material and the conductive aid when the composition is formed into an electrode are excellent. In addition, deterioration of the binder after preparation of a battery can be suppressed, thereby suppressing reduction in the discharge capacity of the lithium secondary battery.

Examples of the aromatic ring include aromatic rings such as a benzene ring and a pyridine ring, and condensed polycyclic aromatic rings such as a naphthalene ring and an anthracene ring.

In a case where the polyvinyl acetal resin has an ionic functional group connected via an acetal bond, the polyvinyl acetal resin preferably has a structural unit of the following formula (3) having an acetyl group, a structural unit of the following formula (4) having an acetal group, and a structural unit of the following formula (5) having an acetal group containing an ionic functional group.

With this structure, the dispersibility of the polyvinyl acetal resin and the dispersibility of the active material and the conductive aid are particularly excellent. In addition, the adhesion force to the current collector and the resistance against electrolytes are also particularly excellent, suppressing reduction in the discharge capacity of the lithium secondary battery.

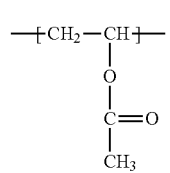

(3)

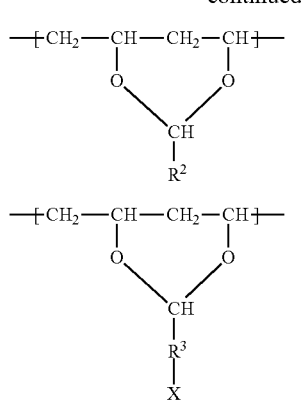

(4)

(5)

In the formula (4), $R^2$ represents a hydrogen atom or a C1-C20 alkyl group. In the formula (5), $R^3$ represents a C1-C20 alkylene group or an aromatic ring, and X represents an ionic functional group.

The amount of the acetal bond having an ionic functional group in the polyvinyl acetal resin is preferably adjusted to set the ionic functional group content of the polyvinyl acetal resin within the above appropriate range. To set the ionic functional group content of the polyvinyl acetal resin within the above appropriate range, for example, in a case where one acetal bond introduces one ionic functional group, the amount of the acetal bond having an ionic functional group is preferably about 0.1 to 10 mol %. In a case where one acetal bond introduces two ionic functional groups, the amount of the acetal bond having ionic functional groups is preferably about 0.05 to 5 mol %. To achieve all of high dispersibility of the polyvinyl acetal resin, high flexibility of the resin, and high adhesion force of the resin to the current collector, the amount of the acetal bond having an ionic functional group in the polyvinyl acetal resin is preferably 0.5 to 20 mol % of all the acetal bonds.

With the ionic functional group content of the polyvinyl acetal resin within the above range, the dispersibility of the polyvinyl acetal resin in the composition for a lithium secondary battery electrode is improved, and the resistance against electrolytes and the dispersibility of the active material and the conductive aid when the composition is formed into an electrode are excellent. In addition, deterioration of the binder after preparation of a battery is suppressed, thereby suppressing reduction in the discharge capacity of the lithium secondary battery.

The polyvinyl acetal resin having an ionic functional group via an acetal bond in the polyvinyl acetal resin structure may be produced by any method. Examples of the method include a method of reacting a polyvinyl alcohol raw material with an aldehyde having the ionic functional group in advance and then acetalizing the resulting substance, a method of blending an aldehyde having the ionic functional group with an aldehyde raw material upon acetalization of polyvinyl alcohol, and a method of preparing a polyvinyl acetal resin first and then reacting the resin with an aldehyde having the ionic functional group.

Examples of the aldehyde having the ionic functional group include an aldehyde having a sulfonic acid group, an aldehyde having an amino group, an aldehyde having a phosphoric acid group, and an aldehyde having a carboxy group. Specific examples thereof include disodium 4-formylbenzene-1,3 disulfonate, sodium 4-formylbenzene sulfonate, sodium 2-formylbenzene sulfonate, 3-pyridinecarbaldehyde hydrochloride, 4-diethylamino benzaldehyde hydrochloride, 4-dimethylamino benzaldehyde hydrochloride, betaine aldehyde chloride, (2-hydroxy-3-oxopropoxy) phosphoric acid, 5-pyridoxal phosphate, terephthalaldehydic acid, and isophthalaldehydic acid.

Particularly preferably, the polyvinyl acetal resin has an ionic functional group via an acetal bond, where the ionic functional group is a sulfonic acid group or a salt thereof, and the acetal bond and the ionic functional group are connected by a benzene ring. When the polyvinyl acetal resin has such a molecular structure, the dispersibility of the polyvinyl acetal resin in the composition for a lithium secondary battery electrode, the dispersibility of the active material and the conductive aid when the composition is formed into an electrode, and the durability of the binder after preparation of a battery are particularly excellent.

In a case where the polyvinyl acetal resin has a chain molecular structure in which the ionic functional group is bonded to carbon included in the main chain of the polymer, the polyvinyl acetal resin preferably has a structural unit of the following formula (6). When the polyvinyl acetal resin has a structural unit of the following formula (6), the dispersibility of the polyvinyl acetal resin in the composition for a lithium secondary battery electrode and the durability of the binder after preparation of a battery are particularly excellent.

(6)

In the formula (6), C represents a carbon atom in the polymer main chain, $R^4$ represents a hydrogen atom or a methyl group, $R^5$ represents an alkylene group having one or more carbon atoms, and $R^6$ represents an ionic functional group.

$R^4$ is particularly preferably a hydrogen atom.

Examples of $R^5$ include a methylene group, an ethylene group, a propylene group, an isopropylene group, a butylene group, an isobutylene group, a sec-butylene group, and a tert-butylene group. In particular, $R^5$ is preferably a methylene group.

$R^5$ may have a structure including a substitution with a substituent having a hetero atom. Examples of the substituent include an ester group, an ether group, a sulfide group, an amide group, an amine group, a sulfoxide group, a ketone group, and a hydroxy group.

The polyvinyl acetal resin having an ionic functional group directly in the polyvinyl acetal resin structure may be produced by any method. Examples of the method includes a method of reacting a modified polyvinyl alcohol raw material having the ionic functional group with an aldehyde to be acetalized, a method of preparing a polyvinyl acetal resin first and then reacting the polyvinyl acetal resin with a compound having the ionic functional group and a different functional group reactive with the functional group of the polyvinyl acetal resin.

Examples of the method of preparing a modified polyvinyl alcohol having the ionic functional group include a method of copolymerizing a vinyl ester monomer such as vinyl acetate and a monomer having a structure of the formula (7) and then saponifying an ester site of the resulting copolymer resin with an alkali or an acid.

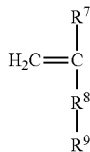
(7)

In the formula (7), $R^7$ represents a hydrogen atom or a methyl group, $R^8$ represents an alkylene group having one or more carbon atoms, and $R^9$ represents an ionic functional group.

The monomer having a structure of the formula (7) is not particularly limited, and examples thereof include those having a carboxy group and a polymerizable functional group, such as 3-butenoic acid, 4-pentenoic acid, 5-hexenic acid, and 9-decenoic acid; those having a sulfonic acid group and a polymerizable functional group, such as allylsulfonic acid, 2-methyl-2-propene-1-sulfonic acid, 2-acrylamide-2-methylpropanesulfonic acid, and 3-(methacryloyloxy)propanesulfonic acid; those having an amino group and a polymerizable functional group, such as N,N-diethylallylamine; and salts of these.

In particular, the use of allylsulfonic acid and salts thereof is favorable because the dispersibility of the polyvinyl acetal resin in the composition for a lithium secondary battery electrode is improved, the resistance against electrolytes and the dispersibility of the active material and the conductive aid when the composition is formed into an electrode are excellent, and deterioration of the binder after preparation of a battery is suppressed to suppress reduction in the discharge capacity of the lithium secondary battery. In particular, sodium allylsulfonate is preferably used.

These monomers may be used alone or in combination of two or more thereof.

In particular, $R^7$ is preferably a hydrogen atom.

Examples of $R^8$ include a methylene group, an ethylene group, a propylene group, an isopropylene group, a butylene group, an isobutylene group, a sec-butylene group, and a tert-butylene group. In particular, $R^8$ is preferably a methylene group.

$R^8$ may have a structure including a substitution with a substituent having a hetero atom. Examples of the substituent include an ester group, an ether group, a sulfide group, an amide group, an amine group, a sulfoxide group, a ketone group, and a hydroxy group.

The amount of the structural unit of the formula (6) in the polyvinyl acetal resin is preferably adjusted to set the ionic functional group content of the polyvinyl acetal resin within the above appropriate range. To set the ionic functional group content of the polyvinyl acetal resin within the above appropriate range, for example, when the structural unit of the formula (6) introduces one ionic functional group, the amount of the structural unit of the formula (6) is preferably about 0.05 to 5 mol %. When the structural unit of the formula (6) introduces two ionic functional groups, the amount of the structural unit of the formula (6) is preferably about 0.025 to 2.5 mol %.

With the ionic functional group content of the polyvinyl acetal resin within the above range, the dispersibility of the polyvinyl acetal resin in the composition for a lithium secondary battery electrode is improved, the resistance against electrolytes and the dispersibility of the active material and the conductive aid are excellent, and deterioration of the binder after preparation of a battery is suppressed to suppress reduction in the discharge capacity of the lithium secondary battery.

The polyvinyl acetal resin is preferably in the form of fine particles.

The polyvinyl acetal resin in the form of fine particles allows partial adhesion (point contact) to surfaces of the active material and the conductive aid, without entirely covering them. As a result, contact between the electrolyte and the active material is favorable to sufficiently maintain conductivity of the lithium ion even under a large current during use of the lithium battery, suppressing reduction in the battery capacity.

The polyvinyl acetal resin in the form of fine particles preferably has a volume average particle size of 10 to 500 nm. When the volume average particle size is 500 nm or less, the dispersibility of the active material and the conductive aid when the composition is formed into an electrode is improved to improve the discharge capacity of the lithium secondary battery. When the volume average particle size is 10 nm or more, the binder does not entirely cover the surfaces of the active material and the conductive aid and the contact between the electrolyte and the active material is improved. In such a case, the conductivity of the lithium ion is sufficient even under a large current during use of the lithium battery, improving the battery capacity. The polyvinyl acetal resin in the form of fine particles has a volume average particle size of more preferably 15 to 300 nm, still more preferably 15 to 200 nm.

The volume average particle size of the polyvinyl acetal resin in the form of fine particles can be measured using a laser diffraction/scattering particle size distribution analyzer, a transmission electron microscope, or a scanning electron microscope.

In relation to the volume average particle size of the polyvinyl acetal resin in the form of fine particles, the upper limit of the CV value is preferably 40%. When the CV value is 40% or lower, fine particles with a large particle size are not present, so that reduction in the stability of the composition for a lithium secondary battery electrode due to sedimentation of large particles is suppressed.

The upper limit of the CV value is preferably 35%, more preferably 32%, still more preferably 30%. The CV value is a value in percentage (%) obtained by dividing the standard deviation by the volume average particle size.

The binder for a power storage device electrode of the present invention preferably contains a dispersion containing the polyvinyl acetal resin dispersed in a dispersing medium.

As the dispersing medium, an aqueous medium is preferably used.

The use of an aqueous medium as the dispersing medium can reduce a residual solvent left in the electrode as far as possible in production of a lithium secondary battery.

In the case of the binder for a power storage device electrode of the present invention, the aqueous medium may consist of water only or contain, in addition to water, a solvent other than water.

The solvent other than water is preferably a solvent that is soluble in water and has high volatility, and examples thereof include alcohols such as isopropyl alcohol, n-propyl alcohol, ethanol, and methanol. The solvents may be used alone or in combination of two or more thereof. The upper limit of the amount of the solvent other than water is preferably 30 parts by weight, more preferably 20 parts by weight, relative to 100 parts by weight of water.

The polyvinyl acetal resin content of the binder for a power storage device electrode of the present invention is not particularly limited. The lower limit thereof is preferably 2% by weight, and the upper limit thereof is preferably 60% by weight. When the polyvinyl acetal resin content is 2% by weight or more, the amount of the polyvinyl acetal resin relative to the amount of an active material is sufficient upon preparation of a composition for a power storage device electrode by mixing the binder and the active material, thereby improving the adhesion force to the current collector. When the polyvinyl acetal resin content is 60% by weight or less, the stability of the polyvinyl acetal resin in an aqueous medium can be improved to suppress agglomeration of particles. Accordingly, the dispersibility of the active material is improved to improve the discharge capacity of a power storage device such as a lithium secondary battery. The polyvinyl acetal resin content is more preferably 5 to 50% by weight.

The binder for a power storage device electrode of the present invention is a binder used for an electrode of a power storage device.

Examples of the power storage device include a lithium secondary battery, an electrical double layer capacitor, and a lithium ion capacitor. In particular, the binder for a power storage device electrode of the present invention is especially suitably used for a lithium secondary battery and a lithium ion capacitor.

The binder for a power storage device electrode of the present invention may be produced by any method. An exemplary method includes preparing a polyvinyl acetal resin; dissolving the polyvinyl acetal resin in an organic solvent that dissolves the polyvinyl acetal resin, such as tetrahydrofuran, acetone, toluene, methyl ethyl ketone, ethyl acetate, methanol, ethanol, butanol, and isopropyl alcohol; adding a poor solvent such as water little by little; heating and/or depressurizing the resulting mixture to remove the organic solvent, thereby allowing precipitation of the polyvinyl acetal resin in the form of fine particles. Another exemplary method includes adding the solution containing a polyvinyl acetal resin dissolved therein to a large amount of water, optionally heating and/or depressurizing the mixture to remove the organic solvent to allow precipitation of the polyvinyl acetal resin in the form of fine particles. Still another exemplary method includes heating a polyvinyl acetal resin at a temperature not lower than the glass transition temperature of the polyvinyl acetal resin and adding water thereto little by little under heating and pressurization with kneading using a kneader or the like.

In particular, the method of dissolving the polyvinyl acetal resin in an organic solvent and precipitating the polyvinyl acetal resin in the form of fine particles is preferred because the polyvinyl acetal resin to be obtained is in the form of fine particles having a small volume average particle size and a narrow particle size distribution. In the above method, the polyvinyl acetal resin in the form of fine particles may be prepared and then dried, followed by dispersion thereof in an aqueous medium. Moreover, the solvent used for preparation of the polyvinyl acetal resin in the form of fine particles may be used as the aqueous medium as it is.

A composition for a power storage device electrode can be prepared by adding an active material to the binder for a power storage device electrode of the present invention. The present invention also encompasses such a composition for a power storage device electrode which contains the binder for a power storage device electrode of the present invention and an active material.

The polyvinyl acetal resin content of the composition for a power storage device electrode of the present invention is not particularly limited. The lower limit of the amount is preferably 0.1 parts by weight and the upper limit thereof is preferably 12 parts by weight, relative to 100 parts by weight of the active material. When the polyvinyl acetal resin content is 0.1 parts by weight or more, the adhesion force to the current collector can be improved. When the polyvinyl acetal content is 12 parts by weight or less, the discharge capacity of the lithium secondary battery can be improved. The polyvinyl acetal resin content is more preferably 0.3 to 5 parts by weight.

The composition for a power storage device electrode of the present invention contains an active material.

The composition for a power storage device electrode of the present invention may be used for either a positive electrode or a negative electrode. Moreover, it may be used for both a positive electrode and a negative electrode. Accordingly, the active material includes a positive-electrode active material and a negative-electrode active material.

Examples of the positive-electrode active material include lithium-containing cobalt oxide ($LiCoO_2$), lithium-containing nickel oxide ($LiNiO_2$), lithium complex oxide of Co—Ni—Mn, lithium complex oxide of Ni—Mn—Al, lithium complex oxide of Ni—Co—Al, lithium manganate ($LiMn_2O_4$), lithium phosphate compounds ($Li_xMPO_4$ (M is at least one selected from Mn, Fe, Co, Ni, Cu, Mg, Zn, V, Ca, Sr, Ba, Ti, Al, Si, B, and Mo, $0 \leq X \leq 2$)). An iron-based oxide having poor electroconductivity may be subjected to reduction firing in the presence of a carbon source substance, to be used as an electrode active material covered with a carbon material. These compounds may be partially elemental-substituted.

These materials may be used alone or in combination of two or more thereof.

As the negative-electrode active material, any of those conventionally used as a negative-electrode active material for lithium secondary batteries may be used. Examples thereof include natural graphite, artificial graphite, amorphous carbon, carbon black, silicon, and those prepared by adding a heteroelement to any of the above substances. Among these, preferred are graphite and silicon, and particularly preferred are spherical natural graphite and silicon.

The composition for a power storage device electrode of the present invention preferably contains a conductive aid.

The conductive aid is used for increasing the output power of the power storage device, and an appropriate material may be used depending on whether the conductive aid is used for a positive electrode or for a negative electrode.

Examples of the conductive aid include graphite, acetylene black, carbon black, Ketjenblack, and vapor-grown carbon fiber. Preferred among these is acetylene black.

The composition for a power storage device electrode of the present invention may contain, in addition to the active material, conductive aid, polyvinyl acetal resin, and aqueous medium, additives such as a flame retardant aid, a thickener, a defoamer, a leveling agent, and an adhesiveness imparting agent, if necessary. Among these, addition of a thickener is preferred because the resulting composition for a power storage device electrode can form a uniform coating film upon application to the current collector.

The composition for a power storage device electrode of the present invention may be produced by any method. For example, it may be produced by mixing the active material, conductive aid, polyvinyl acetal resin, aqueous medium, and various additives added optionally using a mixer such as a ball mill, a blender mill, or a triple roll mill.

The composition for a power storage device electrode of the present invention is, for example, applied to a conductive substrate and then dried to form a power storage device electrode. The present invention also encompasses a power storage device electrode produced using such a composition for a power storage device electrode.

Various application methods may be employed for application of the composition for a power storage device of the present invention to a conductive substrate, such as the use of an extrusion coater, a reverse roller, a doctor blade, or an applicator.

The present invention also encompasses a power storage device including a power storage device electrode.

Advantageous Effects of Invention

The present invention can provide a binder for a power storage device electrode which is excellent in adhesiveness and capable of improving the flexibility of an electrode to be obtained when used as a binder for a power storage device electrode, and which has high resistance against electrolytes. The present invention can also provide a binder for a power storage device electrode which favorably maintains adhesiveness between active materials in a long-term cycle, and which enables production of a high-capacity storage battery with a small irreversible capacity and low resistance to have excellent output characteristics. The present invention can further provide a composition for a power storage device electrode, a power storage device electrode, and a power storage device each prepared using the binder for a power storage device electrode.

DESCRIPTION OF EMBODIMENTS

The present invention is more specifically described in the following with reference to, but not limited to, examples.
(Preparation of a Dispersion of Polyvinyl Acetal Resin Fine Particles 1)

In a reaction vessel equipped with a thermometer, a stirrer, and a condenser tube, 20 parts by weight of a polyvinyl acetal resin (degree of polymerization: 1,000, degree of butyralization: 58.6 mol %, hydroxy group content: 40 mol %, acetyl group content: 1.4 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.14 M. The reaction thereof was carried out at 81° C. for eight hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 1 in the form of fine particles (hereafter, also referred to as polyvinyl acetal resin fine particles 1) was dispersed (amount of polyvinyl acetal resin fine particles 1: 20% by weight).

According to the measurement of the obtained polyvinyl acetal resin by NMR, the degree of butyralization was 58.3 mol %, the hydroxy group content was 37.6 mol %, the acetyl group content was 1.2 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 2.9 mol %. Further, the proportion of the hydroxy group-containing structural unit with a sequence length of 1 was 9.7% relative to the hydroxy group-containing structural unit as a whole in the obtained polyvinyl acetal resin. According to the measurement using a transmission electron microscope, the obtained polyvinyl acetal resin fine particles 1 had a volume average particle size of 100 nm.
(Preparation of a Dispersion of Polyvinyl Acetal Resin Fine Particles 2)

In a reaction vessel equipped with a thermometer, a stirrer, and a condenser tube, 20 parts by weight of a polyvinyl acetal resin (degree of polymerization: 1,000, degree of butyralization: 47.8 mol %, hydroxy group content: 51 mol %, acetyl group content: 1.2 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 78° C. for six hours, followed by cooling of the reaction solution. Then a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 2 in the form of fine particles (hereafter, also referred to as polyvinyl acetal resin fine particles 2) was dispersed (amount of polyvinyl acetal resin fine particles 2: 20% by weight).

According to the measurement of the obtained polyvinyl acetal resin by NMR, the degree of butyralization was 47.1 mol %, the hydroxy group content was 48.9 mol %, the acetyl group content was 1 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 3 mol %. Further, the proportion of the hydroxy group-containing structural unit with a sequence length of 1 was 10.2% relative to the hydroxy group-containing structural unit as a whole in the obtained polyvinyl acetal resin. According to the measurement using a transmission electron microscope, the obtained polyvinyl acetal resin fine particles 2 had a volume average particle size of 90 nm.
(Preparation of a Dispersion of Polyvinyl Acetal Resin Fine Particles 3)

In a reaction vessel equipped with a thermometer, a stirrer, and a condenser tube, 20 parts by weight of a polyvinyl acetal resin (degree of polymerization: 1,000, degree of butyralization: 63.2 mol %, hydroxy group content: 35 mol %, acetyl group content: 1.8 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 78° C. for four hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 3 in the form of fine particles (hereafter, also referred to as polyvinyl acetal resin fine particles 3) was dispersed (amount of polyvinyl acetal resin fine particles 3: 20% by weight).

According to the measurement of the obtained polyvinyl acetal resin by NMR, the degree of butyralization was 61.6 mol %, the hydroxy group content was 34 mol %, the acetyl group content was 1.4 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 3 mol %. Further, the proportion of the hydroxy group-containing structural unit with a sequence length of 1 was 12.5% relative to the hydroxy group-containing structural unit as a whole in the obtained polyvinyl acetal resin. According to the measurement using a transmission electron microscope, the obtained polyvinyl acetal resin fine particles 3 had a volume average particle size of 110 nm.

(Preparation of a Dispersion of Polyvinyl Acetal Resin Fine Particles 4)

In a reaction vessel equipped with a thermometer, a stirrer, and a condenser tube, 20 parts by weight of a polyvinyl acetal resin (degree of polymerization: 1,000, degree of butyralization: 64.4 mol %, hydroxy group content: 33.8 mol %, acetyl group content: 1.8 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.5 parts by weight of 12 M concentrated hydrochloric acid was added to set the acid concentration of the reaction system to 0.21 M. The reaction thereof was carried out at 75° C. for four hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 4 in the form of fine particles (hereafter, also referred to as polyvinyl acetal resin fine particles 4) was dispersed (amount of polyvinyl acetal resin fine particles 4: 20% by weight).

According to the measurement of the obtained polyvinyl acetal resin by NMR, the degree of butyralization was 63.6 mol %, the hydroxy group content was 31.9 mol %, the acetyl group content was 1.5 mol %, the ionic functional group content of the polyvinyl acetal resin was 0.2 mmol/g, and the amount of the acetal bond (in the formula (5), $R^3$ is a benzene ring, X is sodium sulfonate) having an inonic functional group was 3 mol %. Further, the proportion of the hydroxy group-containing structural unit with a sequence length of 1 was 17.9% relative to the hydroxy group-containing structural unit as a whole in the obtained polyvinyl acetal resin. According to the measurement using a transmission electron microscope, the obtained polyvinyl acetal resin fine particles 4 had a volume average particle size of 110 nm.

(Preparation of a Dispersion of Polyvinyl Acetal Resin Fine Particles 5)

In a reaction vessel equipped with a thermometer, a stirrer, and a condenser tube, 20 parts by weight of a polyvinyl acetal resin (degree of polymerization: 1,000, degree of butyralization: 70 mol %, hydroxy group content: 28.2 mol %, acetyl group content: 1.8 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.1 parts by weight of 12 M concentrated hydrochloric acid was added to set the acid concentration of the reaction system to 0.14 M. The reaction thereof was carried out at 73° C. for one hour, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 5 in the form of fine particles (hereafter, also referred to as polyvinyl acetal resin fine particles 5) was dispersed (amount of polyvinyl acetal resin fine particles 5: 20% by weight).

According to the measurement of the obtained polyvinyl acetal resin by NMR, the degree of butyralization was 69.5 mol %, the hydroxy group content was 26.1 mol %, the acetyl group content was 1.5 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 2.9 mol %. Further, the proportion of the hydroxy group-containing structural unit with a sequence length of 1 was 30.5% relative to the hydroxy group-containing structural unit as a whole in the obtained polyvinyl acetal resin. According to the measurement using a transmission electron microscope, the obtained polyvinyl acetal resin fine particles 5 had a volume average particle size of 140 nm.

(Preparation of a Dispersion of Polyvinyl Acetal Resin Fine Particles 6)

In a reaction vessel equipped with a thermometer, a stirrer, and a condenser tube, 20 parts by weight of a polyvinyl acetal resin (degree of polymerization: 1,000, degree of butyralization: 65 mol %, hydroxy group content: 33.2 mol %, acetyl group content: 1.8 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.3 parts by weight of 12 M concentrated hydrochloric acid was added to set the acid concentration of the reaction system to 0.17 M. The reaction thereof was carried out at 74° C. for three hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 6 in the form of fine particles (hereafter, also referred to as polyvinyl acetal resin fine particles 6) was dispersed (amount of polyvinyl acetal resin fine particles 6: 20% by weight).

According to the measurement of the obtained polyvinyl acetal resin by NMR, the degree of butyralization was 64.4 mol %, the hydroxy group content was 31 mol %, the acetyl group content was 1.6 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 3 mol %. Further, the proportion of the hydroxy group-containing structural unit with a sequence length of 1 was 22.7% relative to the hydroxy group-containing structural unit as a whole in the obtained polyvinyl acetal resin. According to the measurement using a transmission electron microscope, the obtained polyvinyl acetal resin fine particles 6 had a volume average particle size of 130 nm.

(Preparation of a Dispersion of Polyvinyl Acetal Resin Fine Particles 7)

In a reaction vessel equipped with a thermometer, a stirrer, and a condenser tube, 20 parts by weight of a polyvinyl acetal resin (degree of polymerization: 1,000, degree of butyralization: 73.4 mol %, hydroxy group content: 24.8 mol %, acetyl group content: 1.8 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.1 parts by weight of 12 M concentrated hydrochloric acid was added to set the acid concentration of the reaction system to 0.14 M. The reaction thereof was carried out at 72° C. for one hour, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 7 in the form of fine particles (hereafter, also referred to as polyvinyl acetal resin fine particles 7) was dispersed (amount of polyvinyl acetal resin fine particles 7: 20% by weight).

According to the measurement of the obtained polyvinyl acetal resin by NMR, the degree of butyralization was 73.1 mol %, the hydroxy group content was 22.4 mol %, the acetyl group content was 1.6 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 2.9 mol %. Further, the proportion of the hydroxy group-containing structural unit with a sequence length of 1 was 33.6% relative to the hydroxy group-containing structural unit as a whole in the obtained polyvinyl acetal resin. According to the measurement using a transmission electron microscope, the obtained polyvinyl acetal resin fine particles 7 had a volume average particle size of 150 nm.

(Preparation of a Dispersion of Polyvinyl Acetal Resin Fine Particles 8)

In a reaction vessel equipped with a thermometer, a stirrer, and a condenser tube, 20 parts by weight of a polyvinyl acetal resin (degree of polymerization: 1,000, degree of butyralization: 47.8 mol %, hydroxy group content: 51 mol %, acetyl group content: 1.2 mol %) was dissolved in 80 parts by weight of isopropanol. To the obtained solution were added 0.3 parts by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 78° C. for six hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 8 in the form of fine particles (hereafter, also referred to as polyvinyl acetal resin fine particles 8) was dispersed (amount of polyvinyl acetal resin fine particles 8: 20% by weight).

According to the measurement of the obtained polyvinyl acetal resin by NMR, the degree of butyralization was 47.4 mol %, the hydroxy group content was 50.7 mol %, the acetyl group content was 1 mol %, the ionic functional group content of the polyvinyl acetal resin was 0.07 mmol/g, and the amount of the acetal bond (in the formula (5), $R^3$ is a benzene ring, X is sodium sulfonate) having an ionic functional group was 0.9 mol %. Further, the proportion of the hydroxy group-containing structural unit with a sequence length of 1 was 10.4% relative to the hydroxy group-containing structural unit as a whole in the obtained polyvinyl acetal resin. According to the measurement using a transmission electron microscope, the obtained polyvinyl acetal resin fine particles 8 had a volume average particle size of 600 nm.

(Preparation of a Dispersion of Polyvinyl Acetal Resin Fine Particles 9)

In a reaction vessel equipped with a thermometer, a stirrer, and a condenser tube, 20 parts by weight of a polyvinyl acetal resin (degree of polymerization: 1,000, degree of butyralization: 47.8 mol %, hydroxy group content: 51 mol %, acetyl group content: 1.2 mol %) was dissolved in 80 parts by weight of isopropanol. To the obtained solution were added 0.5 parts by weight of sodium 2-folmylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 78° C. for six hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 9 in the form of fine particles (hereafter, also referred to as polyvinyl acetal resin fine particles 9) was dispersed (amount of polyvinyl acetal resin fine particles 9: 20% by weight).

According to the measurement of the obtained polyvinyl acetal resin by NMR, the degree of butyralization was 47.1 mol %, the hydroxy group content was 50.4 mol %, the acetyl group content was 1 mol %, the ionic functional group content of the polyvinyl acetal resin was 0.1 mmol/g, and the amount of the acetal bond (in the formula (5), $R^3$ is a benzene ring, X is sodium sulfonate) having an ionic functional group was 1.5 mol %. Further, the proportion of the hydroxy group-containing structural unit with a sequence length of 1 was 10.4% relative to the hydroxy group-containing structural unit as a whole in the obtained polyvinyl acetal resin. According to the measurement using a transmission electron microscope, the obtained polyvinyl acetal resin fine particles 9 had a volume average particle size of 480 nm.

(Preparation of a Dispersion of Polyvinyl Acetal Resin Fine Particles 10)

In a reaction vessel equipped with a thermometer, a stirrer, and a condenser tube, 20 parts by weight of a polyvinyl acetal resin (degree of polymerization: 1,000, degree of butyralization: 47.8 mol %, hydroxy group content: 51 mol %, acetyl group content: 1.2 mol %) was dissolved in 80 parts by weight of isopropanol. To the obtained solution were added 6 parts by weight of disodium 4-formylbenzene-1,3-disulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 78° C. for six hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 10 in the form of fine particles (hereafter, also referred to as polyvinyl acetal resin fine particles 10) was dispersed (amount of polyvinyl acetal resin fine particles 10: 20% by weight).

According to the measurement of the obtained polyvinyl acetal resin by NMR, the degree of butyralization was 47.1 mol %, the hydroxy group content was 37.9 mol %, the acetyl group content was 1 mol %, the ionic functional group content of the polyvinyl acetal resin was 1.8 mmol/g, and the amount of the acetal bond (in the formula (5), $R^3$ is a benzene ring, X is sodium sulfonate) having an ionic functional group was 14 mol %. Further, the proportion of the hydroxy group-containing structural unit with a sequence length of 1 was 10.9% relative to the hydroxy group-containing structural unit as a whole in the obtained polyvinyl acetal resin. According to the measurement using a transmission electron microscope, the obtained polyvinyl acetal resin fine particles 10 had a volume average particle size of 9 nm.

(Preparation of a Dispersion of Polyvinyl Acetal Resin Fine Particles 11)

In a reaction vessel equipped with a thermometer, a stirrer, and a condenser tube, 20 parts by weight of a polyvinyl acetal resin (degree of polymerization: 1,000, degree of butyralization: 47.8 mol %, hydroxy group content: 51 mol %, acetyl group content: 1.2 mol %) was dissolved in 80 parts by weight of isopropanol. To the obtained solution were added 0.6 parts by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 78° C. for six hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 11 in the form of fine particles (hereafter, also referred to as polyvinyl acetal resin fine particles 11) was dispersed (amount of polyvinyl acetal resin fine particles 11: 20% by weight).

According to the measurement of the obtained polyvinyl acetal resin by NMR, the degree of butyralization was 47.1 mol %, the hydroxy group content was 50 mol %, the acetyl group content was 1 mol %, the ionic functional group content of the polyvinyl acetal resin was 0.1 mmol/g, and the amount of the acetal bond (in the formula (5), $R^3$ is a benzene ring, X is sodium sulfonate) having an ionic functional group was 1.9 mol %. Further, the proportion of the hydroxy group-containing structural unit with a sequence length of 1 was 10.4% relative to the hydroxy group-containing structural unit as a whole in the obtained polyvinyl acetal resin. According to the measurement using a transmission electron microscope, the obtained polyvinyl acetal resin fine particles 11 had a volume average particle size of 240 nm.

(Preparation of a Dispersion of Polyvinyl Acetal Resin Fine Particles 12)

In a reaction vessel equipped with a thermometer, a stirrer, and a condenser tube, 20 parts by weight of a polyvinyl acetal resin (degree of polymerization: 1,000, degree of butyralization: 35.5 mol %, hydroxy group content: 63.3 mol %, acetyl group content: 1.2 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of 12 M concentrated hydrochloric acid was added to set the acid concentration of the reaction system to 0.29 M. The reaction thereof was carried out at 73° C. for one hour, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 12 in the form of fine particles (hereafter, also referred to as polyvinyl acetal resin fine particles 12) was dispersed (amount of polyvinyl acetal resin fine particles 12: 20% by weight).

According to the measurement of the obtained polyvinyl acetal resin by NMR, the degree of butyralization was 34 mol %, the hydroxy group content was 62 mol %, the acetyl group content was 1 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 3 mol %. Further, the proportion of the hydroxy group-containing structural unit with a sequence length of 1 was 27.3% relative to the hydroxy group-containing structural unit as a whole in the obtained polyvinyl acetal resin. According to the measurement using a transmission electron microscope, the obtained polyvinyl acetal resin fine particles 12 had a volume average particle size of 100 nm.

(Preparation of a Dispersion of Polyvinyl Acetal Resin Fine Particles 13)

In a reaction vessel equipped with a thermometer, a stirrer, and a condenser tube, 20 parts by weight of a polyvinyl acetal resin (degree of polymerization: 1,100, degree of butyralization: 70.2 mol %, hydroxy group content: 27.6 mol %, acetyl group content: 2.2 mol %) was dissolved in 80 parts by weight of isopropanol. To the obtained solution were added 2.3 parts by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.3 parts by weight of 12 M concentrated hydrochloric acid was added to set the acid concentration of the reaction system to 0.14 M. The reaction thereof was carried out at 72° C. for one hour, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 13 in the form of fine particles (hereafter, also referred to as polyvinyl acetal resin fine particles 13) was dispersed (amount of polyvinyl acetal resin fine particles 13: 20% by weight).

According to the measurement of the obtained polyvinyl acetal resin by NMR, the degree of butyralization was 68.8 mol %, the hydroxy group content was 25 mol %, the acetyl group content was 2 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 4.2 mol %. Further, the proportion of the hydroxy group-containing structural unit with a sequence length of 1 was 18.6% relative to the hydroxy group-containing structural unit as a whole in the obtained polyvinyl acetal resin. According to the measurement using a transmission electron microscope, the obtained polyvinyl acetal resin fine particles 13 had a volume average particle size of 90 nm.

(Preparation of a Dispersion of Polyvinyl Acetal Resin Fine Particles 14)

In a reaction vessel equipped with a thermometer, a stirrer, and a condenser tube, 20 parts by weight of a polyvinyl acetal resin (degree of polymerization: 1,100, degree of butyralization: 33.1 mol %, hydroxy group content: 65.6 mol %, acetyl group content: 1.3 mol %) was dissolved in 80 parts by weight of isopropanol. To the obtained solution were added 2 parts by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.6 parts by weight of 12 M concentrated hydrochloric acid were added to set the acid concentration of the reaction system to 0.21 M. The reaction thereof was carried out at 73° C. for 1 hour, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 14 in the form of fine particles (hereafter, also referred to as polyvinyl acetal resin fine particles 14) was dispersed (amount of polyvinyl acetal resin fine particles 14: 20% by weight).

According to the measurement of the obtained polyvinyl acetal resin by NMR, the degree of butyralization was 32.5 mol %, the hydroxy group content was 65 mol %, the acetyl group content was 0.8 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 1.7 mol %. Further, the proportion of the hydroxy group-containing structural unit with a sequence length of 1 was 14.6% relative to the hydroxy group-containing structural unit as a whole in the obtained polyvinyl acetal resin. According to the measurement using a transmission electron microscope, the obtained polyvinyl acetal resin fine particles 14 had a volume average particle size of 90 nm.

(Preparation of a Dispersion of Polyvinyl Acetal Resin Fine Particles 15)

In a reaction vessel equipped with a thermometer, a stirrer, and a condenser tube, 20 parts by weight of a polyvinyl acetal resin (degree of polymerization: 1,100, degree of butyralization: 52 mol %, hydroxy group content: 47.8 mol %, acetyl group content: 0.2 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.2 parts by weight of butyraldehyde and 1 part by weight of 12 M concentrated hydrochloric acid were added to set the acid concentration of the reaction system to 0.15 M. The reaction thereof was carried out at 82° C. for six hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 15 in the form of fine particles (hereafter, also referred to as polyvinyl acetal resin fine particles 15) was dispersed (amount of polyvinyl acetal resin fine particles 15: 20% by weight).

According to the measurement of the obtained polyvinyl acetal resin by NMR, the amount of the structural unit of the formula (2) was 0.3 mol %, the degree of butyralization was 51.7 mol %, the hydroxy group content was 45 mol %, the acetyl group content was 0.2 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 2.8 mol %. Further, the proportion of the hydroxy group-containing structural unit with a sequence length of 1 was 9.8% relative to the hydroxy group-containing structural unit as a whole in the obtained polyvinyl acetal resin. According to the measurement using a transmission electron microscope, the obtained polyvinyl acetal resin fine particles 15 had a volume average particle size of 90 nm.

(Preparation of a Dispersion of Polyvinyl Acetal Resin Fine Particles 16)

In a reaction vessel equipped with a thermometer, a stirrer, and a condenser tube, 20 parts by weight of a polyvinyl acetal resin (degree of polymerization: 1,100, degree of butyralization: 45.6 mol %, hydroxy group content: 52.1 mol %, acetyl group content: 2.3 mol %) was dissolved in 80 parts by weight of isopropanol. To the obtained solution were added 0.5 parts by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 3 parts by weight of butyraldehyde and 0.05 parts by weight of 12 M concentrated hydrochloric acid were added to set the acid concentration of the reaction system to 0.12 M. The reaction thereof was carried out at 70° C. for 0.3 hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 16 in the form of fine particles (hereafter, also referred to as polyvinyl acetal resin fine particles 16) was dispersed (amount of polyvinyl acetal resin fine particles 16: 20% by weight).

According to the measurement of the obtained polyvinyl acetal resin by NMR, the amount of the structural unit of the formula (2) was 5 mol %, the degree of butyralization was 46.4 mol %, the hydroxy group content was 45 mol %, the acetyl group content was 2 mol %, the ionic functional group content of the polyvinyl acetal resin was 0.1 mmol/g, the amount of the acetal bond (in the formula (5), $R^3$ is a benzene ring, X is a sodium sulfonate) was 1.6 mol %. Further, the proportion of the hydroxy group-containing structural unit with a sequence length of 1 was 14.5% relative to the hydroxy group-containing structural unit as a whole in the obtained polyvinyl acetal. According to the measurement using a transmission electron microscope, the obtained polyvinyl acetal resin fine particles 16 had a volume average particle size of 300 nm.

(Preparation of a Dispersion of Polyvinyl Acetal Resin Fine Particles 17)

In a reaction vessel equipped with a thermometer, a stirrer, and a condenser tube, 20 parts by weight of a polyvinyl acetal resin (degree of polymerization: 1,100, degree of butyralization: 46.8 mol %, hydroxy group content: 51.8 mol %, acetyl group content: 1.4 mol %) was dissolved in 80 parts by weight of isopropanol. To the obtained solution were added 2 parts by weight of disodium 4-formylbenzene-1,3-disulfonate and 0.05 parts by weight of 12 M concentrated hydrochloric acid to set the acid concentration of the reaction system to 0.12 M. The reaction thereof was carried out at 70° C. for four hours. Then, 1 part by weight of butyraldehyde and 0.5 parts by weight of 12 M concentrated hydrochloric acid were added to set the acid concentration of the reaction system to 0.21 M. The reaction thereof was carried out at 75° C. for four hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 17 in the form of fine particles (hereafter, also referred to as polyvinyl acetal resin fine particles 17) was dispersed (amount of polyvinyl acetal resin fine particles 17: 20% by weight).

According to the measurement of the obtained polyvinyl acetal resin by NMR, the amount of the structural unit of the formula (2) was 2 mol %, the degree of butyralization was 47.4 mol %, the hydroxy group content was 45 mol %, the acetyl group content was 1.1 mol %, the ionic functional group content of the polyvinyl acetal resin was 0.6 mmol/g, and the amount of the acetal bond (in the formula (5), $R^3$ is a benzene ring and X is sodium sulfonate) having an ionic functional group was 4.5 mol %. Further, the proportion of the hydroxy group-containing structural unit with a sequence length of 1 was 12.4% relative to the hydroxy group-containing structural unit as a whole in the obtained polyvinyl acetal resin. According to the measurement using a transmission electron microscope, the obtained polyvinyl acetal resin fine particles 17 had a volume average particle size of 30 nm.

(Preparation of a Dispersion of Polyvinyl Acetal Resin Fine Particles 18)

In a reaction vessel equipped with a thermometer, a stirrer, and a condenser tube, 20 parts by weight of a polyvinyl acetal resin (degree of polymerization: 800, degree of butyralization: 52 mol %, hydroxy group content: 47.9 mol %, acetyl group content: 0.1 mol %) was dissolved in 80 parts by weight of isopropanol. To the obtained solution were added 2 parts by weight of terephthalaldehydic acid and 0.05 parts by weight of 12 M concentrated hydrochloric acid to set the acid concentration of the reaction system to 0.12 M. The reaction thereof was carried out at 70° C. for four hours. Then, 0.1 parts by weight of butyraldehyde and 1 part by weight of 12 M concentrated hydrochloric acid were added to set the acid concentration of the reaction system to 0.29 M. The reaction thereof was carried out at 82° C. for seven hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 18 in the form of fine particles (hereafter, also referred to as polyvinyl acetal resin fine particles 18) was dispersed (amount of polyvinyl acetal resin fine particles 18: 20% by weight).

According to the measurement of the obtained polyvinyl acetal resin by NMR, the amount of the structural unit of the formula (2) was 0.2 mol %, the degree of butyralization was 51.7 mol %, the hydroxy group content was 36 mol %, the acetyl group content was 0.1 mol %, the ionic functional group content of the polyvinyl acetal resin was 1 mmol/g, and the amount of the acetal bond (in the formula (5), $R^3$ is a benzene ring, X is carboxy group) having an ionic functional group was 12 mol %. Further, the proportion of the hydroxy group-containing structural unit with a sequence length of 1 was 25.4% relative to the hydroxy group-containing structural unit as a whole in the obtained polyvinyl acetal resin. According to the measurement using a transmission electron microscope, the obtained polyvinyl acetal resin fine particles 18 had a volume average particle size of 450 nm.

(Preparation of a Dispersion of Polyvinyl Acetal Resin Fine Particles 19)

In a reaction vessel equipped with a thermometer, a stirrer, and a condenser tube, 20 parts by weight of a polyvinyl acetal resin (degree of polymerization: 1,700, degree of butyralization: 37 mol %, hydroxy group content: 55 mol %, acetyl group content: 8 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 3.5 parts by weight of butyraldehyde and 0.05 parts by weight of 12 M concentrated hydrochloric acid were added to set the acid concentration of the reaction system to 0.12 M. The reaction thereof was carried out at 70° C. for 0.3 hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 19 in the form of fine particles (hereafter, also referred to as polyvinyl acetal resin fine particles 19) was dispersed (amount of polyvinyl acetal resin fine particles 19: 20% by weight).

According to the measurement of the obtained polyvinyl acetal resin by NMR, the amount of the structural unit of the formula (2) was 7 mol %, the degree of butyralization was 38 mol %, the hydroxy group content was 45 mol %, the acetyl group content was 7 mol %, the ionic functional group content of the polyvinyl acetal resin was 0.2 mmol/g, and the amount of the acetal bond (in the formula (5), $R^3$ is a benzene ring and X is sodium sulfonate) having an ionic functional group was 3 mol %. Further, the proportion of the hydroxy group-containing structural unit with a sequence length of 1 was 19.2% relative to the hydroxy group-containing structural unit as a whole in the obtained polyvinyl acetal resin. According to the measurement using a transmission electron microscope, the obtained polyvinyl acetal resin fine particles 19 had a volume average particle size of 90 nm.

(Preparation of a Dispersion of Polyvinyl Acetal Resin Fine Particles 20)

In a reaction vessel equipped with a thermometer, a stirrer, and a condenser tube, 20 parts by weight of a polyvinyl acetal resin (degree of polymerization: 1,700, degree of butyralization: 66.6 mol %, hydroxy group content: 31 mol %, acetyl group content: 2.4 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.9 parts by weight of butyraldehyde and 0.5 parts by weight of 12 M concentrated hydrochloric acid were added to set the acid concentration of the reaction system to 0.21 M. The reaction thereof was carried out at 75° C. for four hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 20 in the form of fine particles (hereafter, also referred to as polyvinyl acetal resin fine particles 20) was dispersed (amount of polyvinyl acetal resin fine particles 20: 20% by weight).

According to the measurement of the obtained polyvinyl acetal resin by NMR, the amount of the structural unit of the formula (2) was 2 mol %, the degree of butyralization was 66.8 mol %, the hydroxy group content was 25 mol %, the acetyl group content was 2 mol %, the ionic functional group content of the polyvinyl acetal resin was 0.3 mmol/g, and the amount of the acetal bond (in the formula (5), $R^3$ is a benzene ring and X is sodium sulfonate) having an ionic functional group was 4.2 mol %. Further, the proportion of the hydroxy group-containing structural unit with a sequence length of 1 was 19.7% relative to the hydroxy group-containing structural unit as a whole in the obtained polyvinyl acetal resin. According to the measurement using a transmission electron microscope, the obtained polyvinyl acetal resin fine particles 20 had a volume average particle size of 90 nm.

(Preparation of a Dispersion of Polyvinyl Acetal Resin Fine Particles 21)

In a reaction vessel equipped with a thermometer, a stirrer, and a condenser tube, 20 parts by weight of a polyvinyl acetal resin (degree of polymerization: 1,700, degree of butyralization: 30.3 mol %, hydroxy group content: 68.7 mol %, acetyl group content: 1 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1.5 parts by weight of butyraldehyde and 0.5 parts by weight of 12 M concentrated hydrochloric acid were added to set the acid concentration of the reaction system to 0.21 M. The reaction thereof was carried out at 75° C. for four hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 21 in the form of fine particles (hereafter, also referred to as polyvinyl acetal resin fine particles 21) was dispersed (amount of polyvinyl acetal resin fine particles 21: 20% by weight).

According to the measurement of the obtained polyvinyl acetal resin by NMR, the amount of the structural unit of the formula (2) was 2 mol %, the degree of butyralization was 30.5 mol %, the hydroxy group content was 65 mol %, the acetyl group content was 0.8 mol %, the ionic functional group content of the polyvinyl acetal resin was 0.1 mmol/g, and the amount of the acetal bond (in the formula (5), $R^3$ is a benzene ring, X is sodium sulfonate) having an ionic functional group was 1.7 mol %. Further, the proportion of the hydroxy group-containing structural unit with a sequence length of 1 was 24.1% relative to the hydroxy group-containing structural unit as a whole in the obtained polyvinyl acetal resin. According to the measurement using a transmission electron microscope, the obtained polyvinyl acetal resin fine particles 21 had a volume average particle size of 90 nm.

(Preparation of a Dispersion of Polyvinyl Acetal Resin Fine Particles 22)

In a reaction vessel equipped with a thermometer, a stirrer, and a condenser tube, 20 parts by weight of a polyvinyl acetal resin (degree of polymerization: 1,700, degree of butyralization: 37.2 mol %, hydroxy group content: 61 mol %, acetyl group content: 1.8 mol %) was dissolved in 80 parts by weight of isopropanol. To the obtained solution were added 6 parts by weight of disodium 4-formylbenzene-1,3-disulfonate and 0.05 parts by weight of 12 M concentrated hydrochloric acid to set the acid concentration of the reaction system to 0.12 M. The reaction thereof was carried out at 70° C. for four hours. Then, 1 part by weight of butyraldehyde and 0.5 parts by weight of 12 M concentrated hydrochloric acid were added to set the acid concentration of the reaction system to 0.21 M. The reaction thereof was carried out at 75° C. for four hours, followed by cooling of the reaction solution. Then, a resin was purified by reprecipitation and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 22 in the form of fine particles (hereafter, also referred to as polyvinyl acetal resin fine particles 22) was dispersed (amount of polyvinyl acetal resin fine particles 22: 20% by weight).

According to the measurement of the obtained polyvinyl acetal resin by NMR, the amount of the structural unit of the formula (2) was 2 mol %, the degree of butyralization was 37.5 mol %, the hydroxy group content was 45 mol %, the acetyl group content was 1.5 mol %, the ionic functional group content of the polyvinyl acetal resin was 1.8 mmol/g, and the amount of the acetal bond (in the formula (5), $R^3$ is a benzene ring, X is sodium sulfonate) having an ionic functional group was 14 mol %. Further, the proportion of the hydroxy group-containing structural unit with a sequence length of 1 was 11.9% relative to the hydroxy group-containing structural unit as a whole in the obtained polyvinyl acetal. According to the measurement using a transmission electron microscope, the obtained polyvinyl acetal resin fine particles 22 had a volume average particle size of 9 nm.

(Preparation of a Dispersion of Polyvinyl Acetal Resin Fine Particles 23)

In a reaction vessel equipped with a thermometer, a stirrer, and a condenser tube, 20 parts by weight of a polyvinyl acetal resin (degree of polymerization: 800, degree of butyralization: 50.5 mol %, hydroxy group content: 47.7 mol %, acetyl group content: 1.8 mol %) was dissolved in 80 parts by weight of isopropanol. To the obtained solution were added 0.25 parts by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of butyraldehyde and 0.5 parts by weight of 12 M concentrated hydrochloric acid were added to set the acid concentration of the reaction system to 0.21 M. The reaction thereof was carried out at 75° C. for four hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 23 in the form of fine particles (hereafter, also referred to as polyvinyl acetal resin fine particles 23) was dispersed (amount of polyvinyl acetal resin fine particles 23: 20% by weight).

According to the measurement of the obtained polyvinyl acetal resin by NMR, the amount of the structural unit of the formula (2) was 2 mol %, the degree of butyralization was 50.8 mol %, the hydroxy group content was 45 mol %, the acetyl group content was 1.5 mol %, the ionic functional group content of the polyvinyl acetal resin was 0.05 mmol/g, and the amount of the acetal bond (in the formula (5), $R^3$ is a benzene ring, X is sodium sulfonate) having an ionic functional group was 0.7 mol %. Further, the proportion of the hydroxy group-containing structural unit with a sequence length of 1 was 22.9% relative to the hydroxy group-containing structural unit as a whole in the obtained polyvinyl acetal resin. According to the measurement using a transmission electron microscope, the obtained polyvinyl acetal resin fine particles 23 had a volume average particle size of 700 nm.

(Preparation of a Dispersion of Polyvinyl Acetal Resin Fine Particles 24)

In a reaction vessel equipped with a thermometer, a stirrer, and a condenser tube, 20 parts by weight of a polyvinyl acetal resin (degree of polymerization: 1,100, degree of butyralization: 52 mol %, hydroxy group content: 47.8 mol %, acetyl group content: 0.2 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 1 part by weight of butyraldehyde and 1 part by weight of 12 M concentrated hydrochloric acid were added to set the acid concentration of the reaction system to 0.29 M. The reaction thereof was carried out at 82° C. for six hours, followed by cooling of the reaction solution. Then, a resin was purified by reprecipitation method and finally dried to be collected. The obtained resin was again dissolved in 80 parts by weight of isopropanol, and to the solution was dropwise added 200 parts by weight of water. The solution was stirred under reduced pressure, while the temperature of the solution was maintained at 30° C. The isopropanol and water were thus evaporated. The resulting substance was concentrated to have a solid content of 20% by weight, thereby preparing a dispersion in which polyvinyl acetal resin 24 in the form of fine particles (hereafter, also referred to as polyvinyl acetal resin fine particles 24) was dispersed (amount of polyvinyl acetal resin fine particles 24: 20% by weight).

According to the measurement of the obtained polyvinyl acetal resin by NMR, the amount of the structural unit of the formula (2) was 0.2 mol %, the degree of butyralization was 51.7 mol %, the hydroxy group content was 45 mol %, the acetyl group content was 0.2 mol %, the ionic functional group content of the polyvinyl acetal resin was 0.18 mmol/g, and the amount of the acetal bond (in the formula (5), $R^3$ is a benzene ring, X is sodium sulfonate) having an ionic functional group was 2.9 mol %. Further, the proportion of the hydroxy group-containing structural unit with a sequence length of 1 was 17.4% relative to the hydroxy group-containing structural unit as a whole in the obtained polyvinyl acetal resin. According to the measurement using a transmission electron microscope, the obtained polyvinyl acetal resin fine particles 24 had a volume average particle size of 200 nm.

(Preparation of Polyvinyl Acetal Resin 25)

In a reaction vessel equipped with a thermometer, a stirrer, and a condenser tube, 20 parts by weight of a polyvinyl acetal resin (degree of polymerization: 1,100, degree of butyralization: 52 mol %, hydroxy group content: 47.8 mol %, acetyl group content: 0.2 mol %) was dissolved in 80 parts by weight of isopropanol. To the obtained solution were added 1 part by weight of sodium 2-formylbenzene sulfonate and 0.05 parts by weight of 12 M concentrated hydrochloric acid to set the acid concentration of the reaction system to 0.12 M. The reaction thereof was carried out at 70° C. for four hours. Then, 0.2 parts by weight of butyraldehyde and 1 part by weight of 12 M concentrated hydrochloric acid were added to set the acid concentration of the reaction system to 0.15 M. The reaction thereof was carried out at 82° C. for six hours, followed by cooling of the reaction solution. Then, a resin was purified by reprecipitation method and finally dried, thereby preparing polyvinyl acetal resin 25.

According to the measurement of the obtained polyvinyl acetal resin by NMR, the amount of the structural unit of the formula (2) was 0.3 mol %, the degree of butyralization was 51.7 mol %, the hydroxy group content was 45 mol %, the acetyl group content was 0.2 mol %, the ionic functional group content of the polyvinyl acetal resin was 0.2 mmol/g, and the amount of the acetal bond (in the formula (5), $R^3$ is a benzene ring, X is sodium sulfonate) having an ionic functional group was 2.8 mol %. Further, the proportion of the hydroxy group-containing structural unit with a sequence length of 1 was 9.8% relative to the hydroxy group-containing structural unit as a whole in the obtained polyvinyl acetal resin.

(Preparation of Polyvinyl Acetal Resin 26)

In a reaction vessel equipped with a thermometer, a stirrer, and a condenser tube, 20 parts by weight of a polyvinyl acetal resin (degree of polymerization: 1,000, degree of butyralization: 48.1 mol %, hydroxy group content: 50.7 mol %, acetyl group content: 1.2 mol %) was dissolved in 80 parts by weight of isopropanol. To the obtained solution were added 1 part by weight of butylaldehyde and 0.1 parts by weight of 12 M concentrated hydrochloric acid to set the acid concentration of the reaction system to 0.14 M. The reaction thereof was carried out at 73° C. for one hour, followed by cooling of the reaction solution. Then, a resin was purified by reprecipitation method and finally dried, thereby preparing polyvinyl acetal resin 26.

According to the measurement of the obtained polyvinyl acetal resin by NMR, the amount of the structural unit of the formula (2) (in the formula (2), $R^1$ is a propyl group) was 0.3 mol %, the degree of butyralization was 47.8 mol %, the hydroxy group content was 50.7 mol %, the acetyl group content was 1.2 mol %, the ionic functional group content of the polyvinyl acetal resin was 0 mmol/g, and the amount of the acetal bond having an ionic functional group was 0 mol %. Further, the proportion of the hydroxy group-containing structural unit with a sequence length of 1 was 27.7% relative to the hydroxy group-containing structural unit as a whole in the obtained polyvinyl acetal resin.

TABLE 1

| | Polyvinyl acetal resin | | | | | | | | | |
|---|---|---|---|---|---|---|---|---|---|---|
| | Degree of polymerization | Degree of butyralization (mol %) | Hydroxy group content (mol %) | Acetyl group content (mol %) | Amount of acetal bond having an ionic functional group (mol %) | Amount of structural unit of formula (2) (mol %) | Ionic functional group | Ionic functional group content (mmol/g) | Proportion of hydroxy group-containing structural unit with a sequence length of 1 relative to the hydroxy group-containing structural unit as a whole (% by weight) | Volume average particle size (nm) |
| Polyvinyl acetal resin fine particles 1 | 1000 | 58.3 | 37.6 | 1.2 | 2.9 | — | Sulfonate | 0.2 | 9.7 | 100 |
| Polyvinyl acetal resin fine particles 2 | 1000 | 47.1 | 48.9 | 1 | 3 | — | Sulfonate | 0.2 | 10.2 | 90 |
| Polyvinyl acetal resin fine particles 3 | 1000 | 61.6 | 34 | 1.4 | 3 | — | Sulfonate | 0.2 | 12.5 | 110 |

TABLE 1-continued

| | Polyvinyl acetal resin | | | | | | | | |
|---|---|---|---|---|---|---|---|---|---|
| | Degree of polymerization | Degree of butyralization (mol %) | Hydroxy group content (mol %) | Acetyl group content (mol %) | Amount of acetal bond having an ionic functional group (mol %) | Amount of structural unit of formula (2) (mol %) | Ionic functional group | Ionic functional group content (mmol/g) | Proportion of hydroxy group-containing structural unit with a sequence length of 1 relative to the hydroxy group-containing structural unit as a whole (% by weight) | Volume average particle size (nm) |
| Polyvinyl acetal resin fine particles 4 | 1000 | 63.6 | 31.9 | 1.5 | 3 | — | Sulfonate | 0.2 | 17.9 | 110 |
| Polyvinyl acetal resin fine particles 5 | 1000 | 69.5 | 26.1 | 1.5 | 2.9 | — | Sulfonate | 0.2 | 30.5 | 140 |
| Polyvinyl acetal resin fine particles 6 | 1000 | 64.4 | 31 | 1.6 | 3 | — | Sulfonate | 0.2 | 22.7 | 130 |
| Polyvinyl acetal resin fine particles 7 | 1000 | 73.1 | 22.4 | 1.6 | 2.9 | — | Sulfonate | 0.2 | 33.6 | 150 |
| Polyvinyl acetal resin fine particles 8 | 1000 | 47.4 | 50.7 | 1 | 0.9 | — | Sulfonate | 0.07 | 10.4 | 600 |
| Polyvinyl acetal resin fine particles 9 | 1000 | 47.1 | 50.4 | 1 | 1.5 | — | Sulfonate | 0.1 | 10.4 | 480 |
| Polyvinyl acetal resin fine particles 10 | 1000 | 47.1 | 37.9 | 1 | 14 | — | Sulfonate | 1.8 | 10.9 | 9 |
| Polyvinyl acetal resin fine particles 11 | 1000 | 47.1 | 50 | 1 | 1.9 | — | Sulfonate | 0.1 | 10.4 | 240 |
| Polyvinyl acetal resin fine particles 12 | 1000 | 34 | 62 | 1 | 3 | — | Sulfonate | 0.2 | 27.3 | 100 |
| Polyvinyl acetal resin fine particles 13 | 1100 | 68.8 | 25 | 2 | 4.2 | — | Sulfonate | 0.2 | 18.6 | 90 |
| Polyvinyl acetal resin fine particles 14 | 1100 | 32.5 | 65 | 0.8 | 1.7 | — | Sulfonate | 0.2 | 14.6 | 90 |
| Polyvinyl acetal resin fine particles 15 | 1100 | 51.7 | 45 | 0.2 | 2.8 | 0.3 | Sulfonate | 0.2 | 9.8 | 90 |
| Polyvinyl acetal resin fine particles 16 | 1100 | 46.4 | 45 | 2 | 1.6 | 5 | Sulfonate | 0.1 | 14.5 | 300 |
| Polyvinyl acetal resin fine particles 17 | 1100 | 47.4 | 45 | 1.1 | 4.5 | 2 | Sulfonate | 0.6 | 12.4 | 30 |
| Polyvinyl acetal resin fine particles 18 | 800 | 51.7 | 36 | 0.1 | 12 | 0.2 | Carboxylic acid | 1 | 25.4 | 450 |
| Polyvinyl acetal resin fine particles 19 | 1700 | 38 | 45 | 7 | 3 | 7 | Sulfonate | 0.2 | 19.2 | 90 |
| Polyvinyl acetal resin fine particles 20 | 1700 | 66.8 | 25 | 2 | 4.2 | 2 | Sulfonate | 0.3 | 19.7 | 90 |
| Polyvinyl acetal resin fine particles 21 | 1700 | 30.5 | 65 | 0.8 | 1.7 | 2 | Sulfonate | 0.1 | 24.1 | 90 |
| Polyvinyl acetal resin fine particles 22 | 1700 | 37.5 | 45 | 1.5 | 14 | 2 | Sulfonate | 1.8 | 11.9 | 9 |
| Polyvinyl acetal resin fine particles 23 | 800 | 50.8 | 45 | 1.5 | 0.7 | 2 | Sulfonate | 0.05 | 22.9 | 700 |
| Polyvinyl acetal resin fine particles 24 | 1100 | 51.7 | 45 | 0.2 | 2.9 | 0.2 | Sulfonate | 0.18 | 17.4 | 200 |
| Polyvinyl acetal resin 25 | 1100 | 51.7 | 45 | 0.2 | 2.8 | 0.3 | Sulfonate | 0.2 | 9.8 | — |
| Polyvinyl acetal resin 26 | 1000 | 47.8 | 50.7 | 1.2 | — | 0.3 | — | — | 27.7 | — |

Example 1

(Preparation of a Composition for a Lithium Secondary Battery Positive Electrode)

To 10 parts by weight of the dispersion of polyvinyl acetal resin fine particles 1 obtained as a binder was added 90 parts by weight of water to prepare a 2 wt % polyvinyl acetal resin solution. To 100 parts by weight of this solution were added 50 parts by weight of lithium cobaltate (CELLSEED C-5 available from Nippon Chemical Industrial Co., Ltd.) as a positive-electrode active material, 1 part by weight of acetylene black (DENKA BLACK available from Denki Kagaku Kogyo Kabushiki Kaisha) as a conductive aid, and 1 part by weight of carboxymethyl cellulose (available from Aldrich) as a thickener, thereby preparing a composition for a lithium secondary battery positive electrode.

Examples 2 to 19, Comparative Examples 1 to 8

A composition for a lithium secondary battery positive electrode was prepared in the same manner as in Example 1, except that a dispersion of polyvinyl acetal resin fine particles shown in one of Tables 2 to 5 was used and the amount or type of the polyvinyl acetal resin fine particles was changed.

Example 20, Comparative Example 9

A composition for a lithium secondary battery positive electrode was prepared in the same manner as in Example 1, except that a solution prepared by adding 98 parts by weight of N-methylpyrrolidone to 2 parts by weight of a polyvinyl acetal resin shown in one of Tables 2 to 5, instead of the dispersion of polyvinyl acetal resin fine particles, was used.

Example 21

(Preparation of a Composition for a Lithium Secondary Battery Negative Electrode)

To 10 parts by weight of the dispersion of polyvinyl acetal resin fine particles 1 obtained as a binder was added 90 parts by weight of water to prepare a 2 wt % polyvinyl acetal resin solution. To 100 parts by weight of this solution were added 50 parts by weight of spherical natural graphite (CGB-20 available from Nippon Graphite Industries Co., Ltd.) as a negative-electrode active material, 1 part by weight of acetylene black (DENKA BLACK available from Denki Kagaku Kogyo Kabushiki Kaisha) as a conductive aid, and 1 part by weight of carboxymethyl cellulose (available from Aldrich) as a thickener, thereby preparing a composition for a lithium secondary battery negative electrode.

Examples 22 to 39, Comparative Examples 10 to 17 composition for a lithium secondary battery negative electrode was prepared in the same manner as in Example 21, except that a dispersion of the polyvinyl acetal resin fine particles shown in one of Tables 2 to 5 was used and the amount or type of the polyvinyl acetal resin fine particles was changed.

Example 40, Comparative Example 18

A composition for a lithium secondary battery negative electrode was prepared in the same manner as in Example 21, except that a solution prepared by adding 98 parts by weight of N-methylpyrrolidone to 2 parts by weight of a polyvinyl acetal resin shown in one of Tables 2 to 5, instead of the dispersion of polyvinyl acetal resin fine particles, was used.

Example 41

(Preparation of a Composition for a Lithium Secondary Battery Negative Electrode)

To 10 parts by weight of the dispersion of polyvinyl acetal resin fine particles 1 obtained as a binder was added 90 parts by weight of water to prepare a 2 wt % polyvinyl acetal resin solution. To 100 parts by weight of this solution were added 45 parts by weight of spherical natural graphite (CGB-20 available from Nippon Graphite Industries Co., Ltd.) and 5 parts by weight of silicon (SiO, available from Osaka Titanium Technologies) as negative-electrode active materials, 1 part by weight of acetylene black (DENKA BLACK available from Denki Kagaku Kogyo Kabushiki Kaisha) as a conductive aid, and 1 part by weight of carboxymethyl cellulose (available from Aldrich) as a thickener, thereby preparing a composition for a lithium secondary battery negative electrode.

Examples 42 to 59, Comparative Examples 19 to 26

A composition for a lithium secondary battery negative electrode was prepared in the same manner as in Example 41, except that a dispersion of polyvinyl acetal resin fine particles shown in one of Tables 2 to 5 was used and the amount or type of the polyvinyl acetal resin fine particles was changed.

Example 60, Comparative Example 27

A composition for a lithium secondary battery negative electrode was prepared in the same manner as in Example 41, except that a solution prepared by adding 98 parts by weight of N-methylpyrrolidone to 2 parts by weight of a polyvinyl acetal resin shown in one of Tables 2 to 5, instead of the dispersion of polyvinyl acetal resin fine particles, was used.

<Evaluation>

The following evaluations were performed on the compositions for a lithium secondary battery electrode (for a positive electrode, for a negative electrode) obtained in the examples and comparative examples. Tables 2 to 5 show the results.

(1) Adhesiveness

For the compositions for a lithium secondary battery positive electrode obtained in Examples 1 to 20 and Comparative Examples 1 to 9, the adhesiveness to aluminum foil was checked. For the compositions for a lithium secondary battery negative electrode obtained in Examples 21 to 60 and Comparative Examples 10 to 27, the adhesiveness to copper foil was checked.

(1-1) Adhesiveness to Aluminum Foil

The composition for a lithium secondary battery electrode was applied to aluminum foil (thickness of 15 μm) to have a dry thickness of 40 μm, and dried to prepare a sample in which a sheet-shaped electrode was formed on aluminum foil.

The sample was cut to a size of 10 cm in length and 5 cm in width, and the obtained test piece was attached to an acrylic plate (thickness of 2 mm) with a double-stick tape in such a manner that the aluminum foil side was in contact with the acrylic plate. To the electrode surface of the test piece was placed a tape (product name: Cellotape (®) No. 252 (available from Sekisui Chemical Co., Ltd.)(JIS Z1522 standard)) with a width of 18 mm, and then peeled in a 90° direction at a speed of 300 mm/min. The peeling force (N) for the peeling was measured with an autograph (AGS-J available from Shimadzu Corporation).

(1-2) Adhesiveness to Copper Foil

The peeling force was measured in the same manner as in the "(1-1) Adhesiveness to aluminum foil", except that the aluminum foil was changed to copper foil (thickness of 15 μm).

(2) Dispersibility

An amount of 10 parts by weight of the obtained composition for a lithium secondary battery electrode was mixed and diluted with 90 parts by weight of water, and then stirred in an ultrasonic disperser (US-303 available from SND Co., Ltd.) for 10 minutes. The particle size distribution of the dilution was measured with a laser diffraction particle size distribution analyzer (LA-910 available from Horiba Ltd.) to determine the average dispersion size.

(3) Electrolyte Resistance (Preparation of a Binder Resin Sheet)

To a release-treated polyethylene terephthalate (PET) film was applied each of the polyvinyl acetal resin dispersions or resin solutions used in the examples and comparative examples to a dry thickness of 50 μm, and dried to prepare a binder resin sheet.

The obtained binder resin sheet was cut to a size of 30×50 mm to prepare a test piece.

The obtained test piece was dried at 110° C. for two hours, and the obtained film was weighed to determine the weight (a) of the film.

Next, a mixed solution (1:1 in volume) of ethylene carbonate and diethyl carbonate was prepared as an electrolyte, and the obtained film was immersed in the electrolyte at 25° C. for three days. The film was taken out and the electrolyte on the surface was immediately wiped off. The weight of the resulting film was weighed to determine weight (b).

The film was then immersed in 500 g of pure water for two days to completely remove the electrolyte inside thereof, dried at 110° C. for two hours, and weighed to determine the weight (c).

Based on the weights (a), (b), and (c), the dissolution rate and swelling rate of the binder were calculated using the following equations.

Dissolution rate (%)=[(a−c)/a]×100.

Swelling rate (%)=(b/c)×100.

Separately, the conditions for immersion into an electrolyte were changed to 50° C. for one day, and the dissolution rate and swelling rate of the binder were calculated by the similar methods.

A higher dissolution rate indicates that the resin is more likely to be dissolved in the electrolyte, and a higher swelling rate indicates that the resin is more likely to swell with the electrolyte.

(4) Flexibility

For the compositions for a lithium secondary battery positive electrode obtained in Examples 1 to 20 and Comparative Examples 1 to 9, the flexibility of an electrode prepared using aluminum foil was evaluated. For the compositions for a lithium secondary battery negative electrode obtained in Examples 21 to 60 and Comparative Examples 10 to 27, the flexibility of an electrode prepared using copper foil was evaluated.

(4-1) Flexibility in the Case of Using Aluminum Foil

To aluminum foil (thickness of 15 μm) was applied the composition for a lithium secondary battery electrode to a dry thickness of 40 μm, and dried to prepare a test piece in which a sheet-shaped electrode was formed on aluminum foil.

This sample was cut to a size of 50 cm in length and 2 cm in width, and the obtained test piece was wound around a glass stick with a diameter of 2 mm and left for one day. The sample was released and checked for cracks or fractures in the electrode based on the following criteria.

∘∘ (Excellent): No cracks or fractures were found.

∘ (Good): Slight cracks or fractures were found but peeling of the active material was not at all found.

Δ (Fair): Cracks or fractures were found and partial peeling of the active material was found.

× (Poor): Cracks or fractures were found all around the test piece and peeling of the active material was found in most part.

(4-2) Flexibility in the Case of Using Copper Foil

The flexibility was evaluated in the same manner as in "(4-1) Flexibility in the case of using aluminum foil", except that the aluminum foil was changed to copper foil (thickness of 15 μm).

(5) Evaluation of Battery Performance (5-1) Examples 1 to 20, Comparative Examples 1 to 9

(a) Preparation of a Secondary Battery

The composition for a lithium secondary battery positive electrode obtained in each of Examples 1 to 20 and Comparative Examples 1 to 9 was uniformly applied to aluminum foil (thickness of 15 μm), dried, and cut to a size of ϕ16 mm, thereby preparing a positive electrode. The electrolyte used was a mixed solvent (1:1 in volume) of ethylene carbonate and diethyl carbonate containing $LiPF_6$(1M).

The positive electrode was set in a bipolar coin cell (product name: HS Flat cell (available from Hohsen Corp.)) in such a manner that the electrode layer surface faces upward. Next, a porous polypropylene separator (thickness of 25 μm) punched out to a diameter of 24 mm was placed thereon, and the electrolyte was poured into the cell to avoid entering of air. Then, a lithium metal plate as a counter electrode was further placed thereon, and a top cover was screwed to the cell for sealing, thereby preparing a secondary battery.

(b) Evaluation of Discharge Capacity and Charge-Discharge Cycle

Using a battery test system TOSCAT-3100 available from Toyo System Co., Ltd, the discharge capacity and the charge-discharge cycle of the obtained secondary battery was evaluated.

The evaluation of the discharge capacity and charge-discharge cycle was performed under the conditions of the voltage range of 2.8 to 4.2 V and the temperature of 25° C. The charge-discharge cycle was evaluated based on the calculation of the ratio of the discharge capacity in the 50th cycle to the initial discharge capacity.

(5-2) Examples 21 to 60, Comparative Examples 10 to 27

The composition for a lithium secondary battery negative electrode obtained in each of Examples 21 to 60 and Comparative Examples 10 to 27 was uniformly applied to copper foil (thickness of 15 μm), dried, and cut to a size of ϕ16 mm, thereby preparing a negative electrode.

A sealed-type secondary battery was prepared in the same manner as in (5-1), except that the obtained negative electrode was used. Then, the evaluation of the discharge capacity and charge-discharge cycle was performed. The evaluation of the discharge capacity and charge-discharge cycle was performed under the conditions of the voltage range of 0.03 to 3.0 V and the temperature of 25° C. The charge-discharge cycle was evaluated based on the calculation of the ratio of the discharge capacity in the 50th cycle to the initial discharge capacity.

TABLE 2

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | | | | | | | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| | Lithium cobaltate | Spherical natural graphite | Silicon (SiO) | | Type | Amount (parts by weight) | | | | | | | | | |
| Example 1 | 50 | — | — | 1 | Polyvinyl acetal resin fine particles 1 | 2 | 4.4 | 7.3 | 0.4 | 126 | 0.9 | 131 | ∘∘ | 143 | 96 |
| Example 2 | 50 | — | — | 1 | Polyvinyl acetal resin fine particles 2 | 2 | 4.3 | 7.2 | 0.3 | 116 | 0.8 | 120 | ∘∘ | 156 | 98 |

TABLE 2-continued

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | | | | | | | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| | Lithium cobaltate | Spherical natural graphite | Silicon (SiO) | | Type | Amount (parts by weight) | | | | | | | | | |
| Example 3 | 50 | — | — | 1 | Polyvinyl acetal resin fine particles 3 | 2 | 4.4 | 7.3 | 0.3 | 139 | 0.8 | 152 | ◯◯ | 38 | 95 |
| Example 4 | 50 | — | — | 1 | Polyvinyl acetal resin fine particles 4 | 2 | 4.4 | 7.3 | 0.4 | 161 | 1.2 | 180 | ◯ | 130 | 93 |
| Example 5 | 50 | — | — | 1 | Polyvinyl acetal resin fine particles 6 | 2 | 4.5 | 7 | 1.2 | 170 | 3.1 | 195 | ◯ | 123 | 90 |
| Example 6 | 50 | — | — | 1 | Polyvinyl acetal resin fine particles 8 | 2 | 4.6 | 7.2 | 0.4 | 119 | 0.7 | 131 | ◯ | 127 | 91 |
| Example 7 | 50 | — | — | 1 | Polyvinyl acetal resin fine particles 9 | 2 | 4.7 | 7.2 | 0.4 | 117 | 1 | 128 | ◯◯ | 140 | 93 |
| Example 8 | 50 | — | — | 1 | Polyvinyl acetal resin fine particles 10 | 2 | 4.4 | 7 | 0.2 | 116 | 0.8 | 126 | ◯◯ | 124 | 90 |
| Example 9 | 50 | — | — | 1 | Polyvinyl acetal resin fine particles 11 | 2 | 4.7 | 7.1 | 0.3 | 118 | 0.8 | 127 | ◯◯ | 152 | 98 |
| Example 10 | 50 | — | — | 1 | Polyvinyl acetal resin fine particles 15 | 2 | 4.3 | 7.2 | 0.3 | 112 | 0.8 | 148 | ◯ | 151 | 97 |
| Example 11 | 50 | — | — | 1 | Polyvinyl acetal resin fine particles 15 | 0.3 | 2.8 | 7.1 | 0.3 | 112 | 0.8 | 148 | ◯ | 144 | 96 |
| Example 12 | 50 | — | — | 1 | Polyvinyl acetal resin fine particles 15 | 6 | 5.9 | 7.5 | 0.3 | 112 | 0.8 | 148 | ◯◯ | 135 | 95 |
| Example 13 | 50 | — | — | 1 | Polyvinyl acetal resin fine particles 15 | 15 | 8.2 | 8.1 | 0.3 | 112 | 0.8 | 148 | ◯◯ | 120 | 91 |
| Example 14 | 50 | — | — | 1 | Polyvinyl acetal resin fine particles 16 | 2 | 4.7 | 7.1 | 0.5 | 119 | 1.3 | 145 | ◯◯ | 145 | 96 |
| Example 15 | 50 | — | — | 1 | Polyvinyl acetal resin fine particles 17 | 2 | 5.1 | 6.9 | 0.4 | 113 | 1 | 164 | ◯◯ | 156 | 99 |
| Example 16 | 50 | — | — | 1 | Polyvinyl acetal resin fine particles 19 | 2 | 4.1 | 8 | 0.9 | 133 | 2.1 | 196 | ◯◯ | 140 | 95 |
| Example 17 | 50 | — | — | 1 | Polyvinyl acetal resin fine particles 22 | 2 | 4.6 | 11 | 0.3 | 115 | 0.8 | 148 | ◯◯ | 125 | 90 |
| Example 18 | 50 | — | — | 1 | Polyvinyl acetal resin fine particles 23 | 2 | 2.1 | 15 | 0.6 | 114 | 1.5 | 152 | ◯◯ | 123 | 89 |

TABLE 2-continued

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | Lithium cobaltate | Spherical natural graphite | Silicon (SiO) | | Type | Amount (parts by weight) | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| Example 19 | 50 | — | — | 1 | Polyvinyl acetal resin fine particles 24 | 2 | 4.1 | 8 | 0.8 | 124 | 1.6 | 187 | ○ | 140 | 95 |
| Example 20 | 50 | — | — | 1 | Polyvinyl acetal resin 25 | 2 | 4.5 | 7.5 | 0.3 | 112 | 0.8 | 148 | ○ | 120 | 90 |

TABLE 3

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | Lithium cobaltate | Spherical natural graphite | Silicon (SiO) | | Type | Amount (parts by weight) | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| Example 21 | — | 50 | — | 1 | Polyvinyl acetal resin fine particles 1 | 2 | 4 | 22 | 0.4 | 126 | 0.9 | 131 | ○○ | 330 | 96 |
| Example 22 | — | 50 | — | 1 | Polyvinyl acetal resin fine particles 2 | 2 | 4 | 20 | 0.3 | 116 | 0.8 | 120 | ○○ | 360 | 98 |
| Example 23 | — | 50 | — | 1 | Polyvinyl acetal resin fine particles 3 | 2 | 4 | 22 | 0.3 | 139 | 0.8 | 145 | ○○ | 320 | 96 |
| Example 24 | — | 50 | — | 1 | Polyvinyl acetal resin fine particles 4 | 2 | 4.1 | 24 | 0.4 | 161 | 12 | 180 | ○ | 298 | 94 |
| Example 25 | — | 50 | — | 1 | Polyvinyl acetal resin fine particles 6 | 2 | 4.1 | 24 | 1.2 | 180 | 3.1 | 195 | ○ | 280 | 89 |
| Example 26 | — | 50 | — | 1 | Polyvinyl acetal resin fine particles 8 | 2 | 4.1 | 23 | 0.4 | 119 | 0.7 | 131 | ○ | 290 | 90 |
| Example 27 | — | 50 | — | 1 | Polyvinyl acetal resin fine particles 9 | 2 | 4.2 | 21 | 0.4 | 117 | 1 | 128 | ○○ | 320 | 92 |
| Example 28 | — | 50 | — | 1 | Polyvinyl acetal resin fine particles 10 | 2 | 4.6 | 22 | 0.2 | 116 | 0.8 | 126 | ○○ | 280 | 90 |
| Example 29 | — | 50 | — | 1 | Polyvinyl acetal resin fine particles 11 | 2 | 4.3 | 22 | 0.3 | 118 | 0.8 | 127 | ○○ | 354 | 98 |

TABLE 3-continued

|  | Active material (parts by weight) | | | Conductive aid | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
|  | Lithium cobaltate | Spherical natural graphite | Silicon (SiO) | Acetylene black | Type | Amount (parts by weight) |  |  | Dissolution rate at 25° C. in 3 days (%) | Swelling rate at 25° C. in 3 days (%) | Dissolution rate at 50° C. in 1 day (%) | Swelling rate at 50° C. in 1 day (%) |  | Discharge capacity (mAh/g) | Charge-discharge cycle (%) |
| Example 30 | — | 50 | — | 1 | Polyvinyl acetal resin fine particles 15 | 2 | 4 | 21 | 0.3 | 112 | 0.8 | 148 | ○ | 350 | 97 |
| Example 31 | — | 50 | — | 1 | Polyvinyl acetal resin fine particles 15 | 0.3 | 2.4 | 20 | 0.3 | 112 | 0.8 | 148 | ○ | 335 | 96 |
| Example 32 | — | 50 | — | I | Polyvinyl acetal resin fine particles 15 | 6 | 5.1 | 23 | 0.3 | 112 | 0.8 | 148 | ○○ | 315 | 95 |
| Example 33 | — | 50 | — | 1 | Polyvinyl acetal resin fine particles 15 | 15 | 7 | 25 | 0.3 | 112 | 0.8 | 148 | ○○ | 280 | 92 |
| Example 34 | — | 50 | — | 1 | Polyvinyl acetal resin fine particles 16 | 2 | 4.2 | 20 | 0.5 | 119 | 1.3 | 145 | ○○ | 340 | 96 |
| Example 35 | — | 50 | — | 1 | Polyvinyl acetal resin fine particles 17 | 2 | 4.7 | 19 | 0.4 | 113 | 1 | 164 | ○○ | 360 | 99 |
| Example 36 | — | 50 | — | 1 | Polyvinyl acetal resin fine particles 19 | 2 | 3.6 | 23 | 0.9 | 133 | 2.1 | 196 | ○○ | 327 | 95 |
| Example 37 | — | 50 | — | 1 | Polyvinyl acetal resin fine particles 22 | 2 | 4 | 29 | 0.3 | 115 | 0.8 | 148 | ○○ | 290 | 90 |
| Example 38 | — | 50 | — | 1 | Polyvinyl acetal resin fine particles 23 | 2 | 1.7 | 35 | 0.6 | 114 | 1.5 | 152 | ○○ | 285 | 90 |
| Example 39 | — | 50 | — | 1 | Polyvinyl acetal resin fine particles 24 | 2 | 3.8 | 26 | 0.8 | 124 | 1.6 | 187 | ○ | 334 | 95 |
| Example 40 | — | 50 | — | 1 | Polyvinyl acetal resin 25 | 2 | 4.3 | 24 | 0.3 | 112 | 0.8 | 148 | ○ | 280 | 90 |

TABLE 4

| | Active material (parts by weight) | | | Conductive aid | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | Lithium cobaltate | Spherical natural graphite | Silicon (SiO) | Acetylene black | Type | Amount (parts by weight) | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| Example 41 | — | 45 | 5 | 1 | Polyvinyl acetal resin fine particles 1 | 2 | 4.2 | 16.9 | 0.4 | 126 | 0.9 | 131 | ◯◯ | 530 | 95 |
| Example 42 | — | 45 | 5 | 1 | Polyvinyl acetal resin fine particles 2 | 2 | 4.2 | 15.4 | 0.3 | 112 | 0.8 | 148 | ◯◯ | 597 | 98 |
| Example 43 | — | 45 | 5 | 1 | Polyvinyl acetal resin fine particles 3 | 2 | 4.2 | 16.9 | 0.3 | 130 | 0.8 | 175 | ◯◯ | 530 | 95 |
| Example 44 | — | 45 | 5 | 1 | Polyvinyl acetal resin fine particles 4 | 2 | 4.3 | 17.2 | 0.4 | 161 | 1.2 | 180 | ◯ | 491 | 92 |
| Example 45 | — | 45 | 5 | 1 | Polyvinyl acetal resin fine particles 6 | 2 | 4.0 | 18.9 | 1.2 | 180 | 3.1 | 195 | ◯ | 89 | 82 |
| Example 46 | — | 45 | 5 | 1 | Polyvinyl acetal resin fine particles 8 | 2 | 4.6 | 16.4 | 0.4 | 119 | 0.7 | 131 | ◯ | 89 | 89 |
| Example 47 | — | 45 | 5 | 1 | Polyvinyl acetal resin fine particles 9 | 2 | 4.4 | 16.2 | 0.4 | 112 | 1 | 148 | ◯◯ | 517 | 95 |
| Example 48 | — | 45 | 5 | 1 | Polyvinyl acetal resin fine particles 10 | 2 | 4.5 | 16.6 | 0.2 | 116 | 0.8 | 126 | ◯◯ | 511 | 95 |
| Example 49 | — | 45 | 5 | 1 | Polyvinyl acetal resin fine particles 11 | 2 | 4.5 | 16.9 | 0.3 | 112 | 0.8 | 148 | ◯◯ | 588 | 97 |
| Example 50 | — | 45 | 5 | 1 | Polyvinyl acetal resin fine particles 15 | 2 | 4.2 | 16.2 | 0.3 | 112 | 0.8 | 148 | ◯ | 580 | 97 |
| Example 51 | — | 45 | 5 | 1 | Polyvinyl acetal resin fine particles 15 | 0.3 | 2.5 | 15.4 | 0.3 | 112 | 0.8 | 148 | ◯ | 555 | 96 |
| Example 52 | — | 45 | 5 | 1 | Polyvinyl acetal resin fine particles 15 | 6 | 5.4 | 17.7 | 0.3 | 112 | 0.8 | 148 | ◯◯ | 522 | 95 |
| Example 53 | — | 45 | 5 | 1 | Polyvinyl acetal resin fine particles 15 | 15 | 7.4 | 19.3 | 0.3 | 112 | 0.8 | 148 | ◯◯ | 464 | 92 |
| Example 54 | — | 45 | 5 | 1 | Polyvinyl acetal resin fine particles 15 | 2 | 5.3 | 18.2 | 0.5 | 119 | 1.3 | 145 | ◯◯ | 542 | 97 |
| Example 55 | — | 45 | 5 | 1 | Polyvinyl acetal resin fine particles 16 | 2 | 4.9 | 14.6 | 0.4 | 113 | 1 | 164 | ◯◯ | 597 | 99 |
| Example 56 | — | 45 | 5 | 1 | Polyvinyl acetal resin fine particles 17 | 2 | 3.8 | 17.7 | 0.9 | 133 | 2.1 | 196 | ◯◯ | 542 | 95 |

TABLE 4-continued

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | Lithium cobaltate | Spherical natural graphite | Silicon (SiO) | | Type | Amount (parts by weight) | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| Example 57 | — | 45 | 5 | 1 | Polyvinyl acetal resin fine particles 22 | 2 | 4.2 | 22.3 | 0.3 | 115 | 0.8 | 148 | ∞ | 481 | 90 |
| Example 58 | — | 45 | 5 | 1 | Polyvinyl acetal resin fine particles 23 | 2 | 1.8 | 27.0 | 0.6 | 114 | 1.5 | 152 | ∞ | 472 | 90 |
| Example 59 | — | 45 | 5 | 1 | Polyvinyl acetal resin fine particles 24 | 2 | 3.9 | 17.4 | 0.8 | 124 | 1.6 | 187 | ○ | 534 | 94 |
| Example 60 | — | 45 | 5 | 1 | Polyvinyl acetal resin 25 | 2 | 4.3 | 24 | 0.3 | 112 | 0.8 | 148 | ○ | 468 | 90 |

TABLE 5

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | Lithium cobaltate | Spherical natural graphite | Silicon (SiO) | | Type | Amount (parts by weight) | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| Comparative Example 1 | 50 | — | — | 1 | Polyvinyl acetal resi fine particles 5 | 2 | 4.3 | 19 | 94 | 350 | 99 | 450 | × | Not measurable due to binder dissolution | |
| Comparative Example 2 | 50 | — | — | 1 | Polyvinyl acetal resin fine particles 7 | 2 | 2.1 | 17.9 | 93 | 470 | 100 | 550 | × | Not measurable due to binder dissolution | |
| Comparative Example 3 | 50 | — | — | 1 | Polyvinyl acetal resin fine particles 12 | 2 | 3.6 | 7.8 | 67 | 400 | 71 | 475 | Δ | Not measurable due to binder dissolution | |
| Comparative Example 4 | 50 | — | — | 1 | Polyvinyl acetal resin fine particles 13 | 2 | 4 | 12 | 76 | 154 | 84 | 368 | ○ | Not measurable due to binder dissolution | |
| Comparative Example 5 | 50 | — | — | 1 | Polyvinyl acetal resin fine particles 14 | 2 | 4 | 11.4 | 61 | 106 | 70 | 342 | ○ | Not measurable due to binder dissolution | |

TABLE 5-continued

| | Active material (parts by weight) | | | Conductive aid Acetylene black | Polyvinyl acetal resin | | (1) Adhesiveness Peeling force (N) | (2) Dispersibility Average dispersion size (μm) | (3) Electrolyte resistance | | | | (4) Flexibility | (5) Battery performance | |
|---|---|---|---|---|---|---|---|---|---|---|---|---|---|---|---|
| | | | | | | | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| | Lithium cobaltate | Spherical natural graphite | Silicon (SiO) | | Type | Amount (parts by weight) | | | | | | | | | |
| Comparative Example 6 | 50 | — | — | 1 | Polyvinyl acetal resin fine particles 18 | 2 | 3.8 | 9 | 3 | 165 | 8 | 248 | Δ | 98 | 79 |
| Comparative Example 7 | 50 | — | — | 1 | Polyvinyl acetal resin fine particles 20 | 2 | 3.6 | 7.8 | 90 | 450 | 98 | 640 | ∞ | Not measurable due to binder dissolution | |
| Comparative Example 8 | 50 | — | — | 1 | Polyvinyl acetal resin fine particles 21 | 2 | 4.3 | 19 | 0.2 | 107 | 0.7 | 149 | × | 103 | 80 |
| Comparative Example 9 | 50 | — | — | 1 | Polyvinel acetal resin 26 | 2 | 4 | 13 | 1.4 | 126 | 3.5 | 179 | × | 96 | 75 |
| Comparative Example 10 | — | 50 | — | 1 | Polyvinyl acetal resi fine particles 5 | 2 | 3.4 | 40 | 94 | 350 | 99 | 450 | × | Not measurable due to binder dissolution | |
| Comparative Example 11 | — | 50 | — | 1 | Polyvinyl acetal resin fine particles 7 | 2 | 1.5 | 26 | 93 | 470 | 100 | 550 | × | Not measurable due to binder dissolution | |
| Comparative Example 12 | — | 50 | — | 1 | Polyvinyl acetal resin fine particles 12 | 2 | 3 | 23 | 67 | 470 | 71 | 550 | Δ | Not measurable due to binder dissolution | |
| Comparative Example 13 | — | 50 | — | 1 | Polyvinyl acetal resin fine particles 13 | 2 | 3.2 | 26.4 | 76 | 154 | 84 | 368 | ○ | Not measurable due to binder dissolution | |
| Comparative Example 14 | — | 50 | — | 1 | Polyvinyl acetal resin fine particles 14 | 2 | 3.3 | 31 | 61 | 106 | 70 | 342 | ○ | Not measurable due to binder dissolution | |
| Comparative Example 15 | — | 50 | — | 1 | Polyvinyl acetal resin fine particles 18 | 2 | 3.2 | 25 | 3 | 165 | 8 | 248 | Δ | 225 | 78 |
| Comparative Example 16 | — | 50 | — | 1 | Polyvinyl acetal resin fine particles 20 | 2 | 3 | 23 | 90 | 450 | 98 | 640 | ∞ | Not measurable due to binder dissolution | |

TABLE 5-continued

| | Active material (parts by weight) | | | Conductive aid | Polyvinyl acetal resin | | Evaluation | | | | | | | | |
|---|---|---|---|---|---|---|---|---|---|---|---|---|---|---|---|
| | | | | | | | (1) Adhesiveness Peeling force (N) | (2) Dispersibility Average dispersion size (μm) | (3) Electrolyte resistance | | | | (4) Flexibility | (5) Battery performance | |
| | | | | | | | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| | Lithium cobaltate | Spherical natural graphite | Silicon (SiO) | Acetylene black | Type | Amount (parts by weight) | | | | | | | | | |
| Comparative Example 17 | — | 50 | — | 1 | Polyvinyl acetal resin fine particles 21 | 2 | 3.4 | 40 | 0.2 | 107 | 0.7 | 149 | × | 240 | 78 |
| Comparative Example 18 | — | 50 | — | 1 | Polyvinel acetal resin 26 | 2 | 3.9 | 32 | 1.4 | 126 | 3.5 | 179 | × | 215 | 73 |
| Comparative Example 19 | — | 45 | 5 | 1 | Polyvinyl acetal resi fine particles 5 | 2 | 3.6 | 30.8 | 94 | 350 | 99 | 450 | × | Not measurable due to binder dissolution | |
| Comparative Example 20 | — | 45 | 5 | 1 | Polyvinyl acetal resin fine particles 7 | 2 | 3.5 | 24.6 | 93 | 470 | 100 | 550 | × | Not measurable due to binder dissolution | |
| Comparative Example 21 | — | 45 | 5 | 1 | Polyvinyl acetal resin fine particles 12 | 2 | 3.2 | 17.7 | 67 | 400 | 71 | 475 | Δ | Not measurable due to binder dissolution | |
| Comparative Example 22 | — | 45 | 5 | 1 | Polyvinyl acetal resin fine particles 13 | 2 | 3.5 | 22.2 | 76 | 154 | 84 | 368 | ○ | Not measurable due to binder dissolution | |
| Comparative Example 23 | — | 45 | 5 | 1 | Polyvinyl acetal resin fine particles 14 | 2 | 3.3 | 18.1 | 61 | 106 | 70 | 342 | ○ | Not measurable due to binder dissolution | |
| Comparative Example 24 | — | 45 | 5 | 1 | Polyvinyl acetal resin fine particles 18 | 2 | 3.4 | 19.3 | 3 | 165 | 8 | 248 | Δ | 370 | 74 |
| Comparative Example 25 | — | 45 | 5 | 1 | Polyvinyl acetal resin fine particles 20 | 2 | 3.7 | 22.4 | 90 | 450 | 98 | 640 | ○○ | Not measurable due to binder dissolution | |
| Comparative Example 26 | — | 45 | 5 | 1 | Polyvinyl acetal resin fine particles 21 | 2 | 3.3 | 19.4 | 0.2 | 107 | 0.7 | 149 | × | 389 | 7 |

TABLE 5-continued

| | Active material (parts by weight) | | | Conductive aid | Polyvinyl acetal resin | | Evaluation | | | | | | | | |
|---|---|---|---|---|---|---|---|---|---|---|---|---|---|---|---|
| | | | | | | | (1) Adhesiveness Peeling force (N) | (2) Dispersibility Average dispersion size (μm) | (3) Electrolyte resistance | | | | (4) Flexibility | (5) Battery performance | |
| | | | | | | | | | Dissolution rate at 25° C. in 3 days (%) | Swelling rate at 25° C. in 3 days (%) | Dissolution rate at 50° C. in 1 day (%) | Swelling rate at 50° C. in 1 day (%) | | Discharge capacity (mAh/g) | Charge-discharge cycle (%) |
| | Lithium cobaltate | Spherical natural graphite | Silicon (SiO) | Acetylene black | Type | Amount (parts by weight) | | | | | | | | | |
| Comparative Example 27 | — | 4.5 | 5 | 1 | Polyvinel acetal resin 26 | 2 | 4.1 | 24.6 | 1.4 | 126 | 3.5 | 179 | × | 358 | 70 |

INDUSTRIAL APPLICABILITY

The present invention can provide a binder for a power storage device electrode which is excellent in adhesiveness and capable of improving the flexibility of an electrode to be obtained when used as a binder for a power storage device electrode, and which has high resistance against electrolytes. The present invention can also provide a binder for a power storage device electrode which has excellent electrolyte resistance to favorably maintain adhesiveness between active materials in a long-term cycle, and which enables production of a high-capacity storage battery with a small irreversible capacity and low resistance to have excellent output characteristics. The present invention can further provide a composition for a power storage device electrode, a power storage device electrode, and a power storage device each prepared using the binder for a power storage device electrode.

The invention claimed is:

1. A binder for a power storage device electrode used for an electrode of a power storage device, the binder comprising a polyvinyl acetal resin, wherein the polyvinyl acetal resin has a hydroxy group-containing structural unit of the formula (1) comprising a hydroxy group-containing structural unit with a sequence length of 1, the hydroxy group-containing structural unit with a sequence length of 1 constitutes 25% by weight or less of the whole hydroxy group-containing structural unit in the polyvinyl acetal resin, and the polyvinyl acetal resin has a hydroxy group content of 30 to 60 mol %:

, and wherein the polyvinyl acetal resin has a structural unit of the formula (3) having an acetyl group, a structural unit of the formula (4) having an acetal group, and a structural unit of the formula (5) having an acetal group including an ionic functional group:

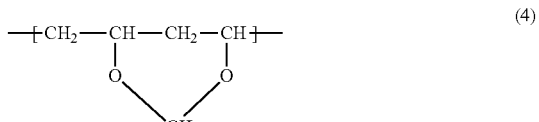

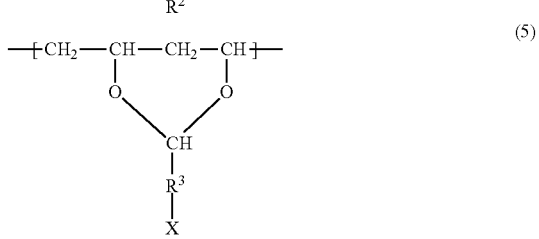

wherein, in the formula (4), $R^2$ represents a hydrogen atom or a C1-C20 alkyl group, and in the formula (5), $R^3$ represents a C1-C20 alkylene group or an aromatic ring, and X represents an ionic functional group.

2. The binder for a power storage device electrode according to claim 1, wherein the polyvinyl acetal resin has a structural unit of the formula (2) in an amount of 0.3 mol % or more:

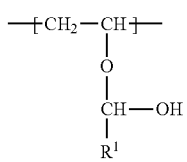

wherein $R^1$ represents a hydrogen atom or a C1-C20 alkyl group.

3. The binder for a power storage device electrode according to claim 2, wherein the polyvinyl acetal resin has the structural unit of the formula (2) in the amount of 0.3 to 5 mol %.

4. The binder for a power storage device electrode according to claim 1, comprising a dispersion containing the polyvinyl acetal resin dispersed in an aqueous medium,
wherein the polyvinyl acetal resin is in the form of fine particles.

5. The binder for a power storage device electrode according to claim 4,
wherein the polyvinyl acetal resin has a volume average particle size of 10 to 500 nm.

6. A composition for a power storage device electrode, comprising the binder for a power storage device electrode according to claim 1 and an active material,
the composition containing the polyvinyl acetal resin in an amount of 0.1 to 12 parts by weight relative to 100 parts by weight of the active material.

7. A power storage device electrode comprising the composition for a power storage device electrode according to claim 6.

8. A power storage device comprising a power storage device electrode according to claim 7.

9. The binder for a power storage device electrode according to claim 2, comprising a dispersion containing the polyvinyl acetal resin dispersed in an aqueous medium,
wherein the polyvinyl acetal resin is in the form of fine particles.

10. The binder for a power storage device electrode according to claim 9,
wherein the polyvinyl acetal resin has a volume average particle size of 10 to 500 nm.

11. A composition for a power storage device electrode, comprising the binder for a power storage device electrode according to claim 2 and an active material,
the composition containing the polyvinyl acetal resin in an amount of 0.1 to 12 parts by weight relative to 100 parts by weight of the active material.

12. A power storage device electrode comprising the composition for a power storage device electrode according to claim 11.

13. A power storage device comprising a power storage device electrode according to claim 12.

14. The binder for a power storage device electrode according to claim 3, comprising a dispersion containing the polyvinyl acetal resin dispersed in an aqueous medium,
wherein the polyvinyl acetal resin is in the form of fine particles.

15. The binder for a power storage device electrode according to claim 14,
wherein the polyvinyl acetal resin has a volume average particle size of 10 to 500 nm.

16. A composition for a power storage device electrode, comprising the binder for a power storage device electrode according to claim 3 and an active material,
the composition containing the polyvinyl acetal resin in an amount of 0.1 to 12 parts by weight relative to 100 parts by weight of the active material.

17. A power storage device electrode comprising the composition for a power storage device electrode according to claim 16.

18. A power storage device comprising a power storage device electrode according to claim 17.

* * * * *